(12) United States Patent
Tenny et al.

(10) Patent No.: US 10,477,608 B2
(45) Date of Patent: Nov. 12, 2019

(54) SYSTEM AND METHOD FOR NETWORK ACCESS USING A RELAY

(71) Applicant: Futurewei Technologies, Inc., Plano, TX (US)

(72) Inventors: Nathan Edward Tenny, Poway, CA (US); Haibo Xu, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 103 days.

(21) Appl. No.: 15/703,335

(22) Filed: Sep. 13, 2017

(65) Prior Publication Data

US 2018/0092150 A1   Mar. 29, 2018

Related U.S. Application Data

(60) Provisional application No. 62/401,651, filed on Sep. 29, 2016.

(51) Int. Cl.
  *H04W 4/00* (2018.01)
  *H04W 76/16* (2018.01)
  (Continued)

(52) U.S. Cl.
  CPC .......... *H04W 76/16* (2018.02); *H04W 4/18* (2013.01); *H04W 4/80* (2018.02); *H04W 76/14* (2018.02); *H04L 67/12* (2013.01); *H04L 67/42* (2013.01)

(58) Field of Classification Search
  CPC ....... H04W 76/16; H04W 76/14; H04W 4/80; H04W 4/18; H04W 76/15; H04W 8/065;
  (Continued)

(56) References Cited

U.S. PATENT DOCUMENTS 5,901,352 A * 5/1999 St-Pierre ........... H04L 29/12009
                                                      455/426.1
8,243,615 B2   8/2012 Hamalainen et al.
(Continued)

FOREIGN PATENT DOCUMENTS

CN   101841934 A    9/2010
CN   101841934 B  * 11/2012
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.9.0, Technical Specification, Jun. 2009, 159 pages.
(Continued)

*Primary Examiner* — Mahendra R Patel
(74) *Attorney, Agent, or Firm* — Slater Matsil, LLP

(57) ABSTRACT

A method for operating a user equipment (UE) includes receiving, by the UE from a network, a mobile subscriber identifier for the UE, the mobile subscriber identifier being exclusively assigned to the UE within a wireless tracking area of the network, and transmitting, by the UE to a relay node, an initial message of an access procedure for accessing a user data service of the network, wherein the initial message comprises a request to connect to a control node of the network, and wherein the initial message includes the mobile subscriber identifier, and an indication to relay the initial message over a first signaling radio bearer (SRB) to the control node.

24 Claims, 12 Drawing Sheets

(51) Int. Cl.
*H04W 76/14* (2018.01)
*H04W 4/80* (2018.01)
*H04W 4/18* (2009.01)
*H04L 29/08* (2006.01)
*H04L 29/06* (2006.01)

(58) Field of Classification Search
CPC ....... H04W 24/08; H04W 8/06; H04W 72/04; H04W 74/002; H04W 76/10; H04W 84/047; H04W 76/12; H04W 36/0069; H04W 36/0055; H04L 67/12; H04L 67/42
USPC ..... 370/328, 252, 315; 455/436, 435.1, 411; 713/151
See application file for complete search history.

(56) References Cited

U.S. PATENT DOCUMENTS

| | | | |
|---|---|---|---|
| 9,155,107 B2 | 10/2015 | Chen et al. | |
| 2009/0265543 A1* | 10/2009 | Khetawat | H04L 63/104 713/151 |
| 2010/0135201 A1* | 6/2010 | Lewis | G06F 8/65 370/328 |
| 2010/0203865 A1* | 8/2010 | Horn | H04W 48/16 455/411 |
| 2012/0002592 A1* | 1/2012 | Yang | H04B 7/155 370/315 |
| 2012/0015666 A1* | 1/2012 | Horn | H04L 45/021 455/456.1 |
| 2012/0102008 A1* | 4/2012 | Kaariainen | H04W 4/21 707/705 |
| 2013/0016649 A1* | 1/2013 | Damnjanovic | H04W 88/04 370/315 |
| 2013/0294321 A1* | 11/2013 | Wang | H04W 4/06 370/312 |
| 2014/0126460 A1* | 5/2014 | Bienas | H04W 74/002 370/315 |
| 2015/0282132 A1* | 10/2015 | Kim | H04W 8/005 370/329 |
| 2015/0334551 A1* | 11/2015 | Aminaka | H04W 76/15 370/252 |
| 2016/0135063 A1* | 5/2016 | Ham | H04W 24/02 370/328 |

FOREIGN PATENT DOCUMENTS

| | | | | |
|---|---|---|---|---|
| CN | 105657838 A | * | 6/2016 | ............ H04W 88/04 |
| EP | 1858203 A1 | * | 11/2007 | ............ H04W 92/02 |
| EP | 3487260 A1 | | 5/2019 | |
| WO | 2009056511 A1 | | 5/2009 | |
| WO | WO-2009056511 A1 | * | 5/2009 | ............ H04W 72/02 |
| WO | 2010145505 A1 | | 12/2010 | |
| WO | WO-2010145505 A1 | * | 12/2010 | .......... H04W 74/006 |
| WO | 2011035488 A1 | | 3/2011 | |
| WO | WO-2011035488 A1 | * | 3/2011 | ............ H04W 72/12 |
| WO | 2014112001 A1 | | 7/2014 | |
| WO | WO-2014112001 A1 | * | 7/2014 | ............ H04W 76/15 |
| WO | WO-2018059324 A1 | * | 4/2018 | ............ H04W 4/18 |

OTHER PUBLICATIONS

"3rd Generation Partnership Project; Technical Specification Group Radio Access Network; Evolved Universal Terrestrial Radio Access (E-UTRA) Medium Access Control (MAC) protocol specification (Release 8)," 3GPP TS 36.321 V8.6.0, Technical Specification, Jun. 2009, 47 pages.

* cited by examiner

SYSTEM AND METHOD FOR NETWORK ACCESS USING A RELAY

This application claims the benefit of U.S. Provisional Application No. 62/401,651, filed on Sep. 29, 2016, entitled "System and Method for Network Access Using a Relay," which application is hereby incorporated herein by reference.

TECHNICAL FIELD

The present disclosure relates generally to a system and method for digital communications, and, in particular embodiments, to a system and method for network access using a relay.

BACKGROUND

Internet of Things (IoT) devices include objects with embedded electronics, software, sensors, as well as connectivity that enable the objects to exchange information with an operator, a manufacturer, a user, and/or other connected objects. IoT devices are typically small and are frequently battery powered. As an example, IoT devices used in sensing operations (e.g., weather, fire, security, health, automotive, and so on) are expected to operate for years without battery replacement or user intervention. Therefore, battery life is an important consideration.

Although these IoT devices are connected, their connectivity may be restricted to short range technologies, such as PC5, BlueTooth (BT), device-to-device (D2D), Proximity Services (ProSe), and so on, in order to help minimize power consumption. These short range technologies may be used to connect IoT devices to relay nodes that have long-range connectivity. In the future, devices such as cellular phones that have long-range connectivity may also be extensively used as remote devices connected to relay nodes, since they may benefit from potentially increased spectrum availability associated with short range technologies. Furthermore, even when such devices support long-range connectivity, they may benefit substantially from reduced power consumption if they can avoid using this long-range connectivity and instead rely on short-range communication with a relay node.

SUMMARY

Example embodiments provide a system and method for network access using a relay.

In accordance with an example embodiment, a method for operating a user equipment (UE) is provided. The method includes receiving, by the UE from a network, a mobile subscriber identifier for the UE, the mobile subscriber identifier being exclusively assigned to the UE within a wireless tracking area of the network, and transmitting, by the UE to a relay node, an initial message of an access procedure for accessing a user data service of the network, wherein the initial message comprises a request to connect to a control node of the network, and wherein the initial message includes the mobile subscriber identifier, and an indication to relay the initial message over a first signaling radio bearer (SRB) to the control node.

Optionally, in any of the preceding embodiments, wherein the method further comprises receiving, by the UE from the relay node, a setup message on the first SRB.

Optionally, in any of the preceding embodiments, wherein the method further comprises transmitting, by the UE to the relay node, a setup complete message on a second SRB.

Optionally, in any of the preceding embodiments, wherein the first SRB is characterized by transparent operation of a link layer protocol.

Optionally, in any of the preceding embodiments, wherein the relay node comprises a second UE.

Optionally, in any of the preceding embodiments, wherein the access procedure is a contentionless access procedure.

In accordance with an example embodiment, a method for operating a relay node in a network is provided. The method includes receiving, by the relay node from a control node of the network, an initial downlink message of an access procedure, wherein the initial downlink message is addressed in accordance with an identity of the relay node, wherein the initial downlink message includes a setup request to establish a connection between the control node and a remote device, and an indication that the initial downlink message is associated with a first SRB for transmission to the remote device, and sending, by the relay node, the setup request to the remote device.

Optionally, in any of the preceding embodiments, wherein the method further comprises receiving, by the relay node from the remote device, an initial uplink message of the access procedure, wherein the initial uplink message is a request to connect to the control node of the network, and wherein the initial uplink message includes a mobile subscriber identifier of the remote device, the mobile subscriber identifier being exclusively assigned to the remote device within a wireless tracking area of the network, and an indication that the initial uplink message is associated with the first SRB for transmission to the control node, and sending, by the relay node to the control node, the initial uplink message to the control node in a second SRB, and an indication that the initial uplink message is associated with the first SRB.

Optionally, in any of the preceding embodiments, wherein the method further comprises receiving, by the relay node from the remote device, a secondary uplink message of the access procedure, wherein the secondary uplink message comprises a setup complete indicating completion of the access procedure.

Optionally, in any of the preceding embodiments, wherein the initial downlink message further comprises a logical identifier of the remote device that uniquely identifies the remote device to the relay node.

Optionally, in any of the preceding embodiments, wherein the initial downlink message does not include physical configuration information for the remote device.

In accordance with an example embodiment, a method for operating a control node of a network is provided. The method includes receiving, by the control node from a relay device, a forwarded request to connect to the control node by a remote device, wherein the forwarded request is an initial message received by the control node in an access procedure, the forwarded request including a mobile subscriber identifier being exclusively assigned to the remote device within a wireless tracking area of the network, and an indication that the forwarded request is associated with a first SRB for transmission from the remote device to the control node, and configuring a context for the remote device, by the control node, in accordance with the mobile subscriber identifier.

Optionally, in any of the preceding embodiments, wherein the method further comprises storing, by the control node, the configured context for the remote device.

Optionally, in any of the preceding embodiments, wherein the method further comprises sending, by the control node, a control message from a media access control layer of the control node to a radio resource control layer of the control node, wherein the control message comprises the mobile subscriber identifier.

Optionally, in any of the preceding embodiments, wherein the forwarded request further comprises a logical identifier for the remote device that uniquely identifies the remote device relative to the relay device.

In accordance with an example embodiment, a UE is provided. The UE includes one or more processors, and a computer readable storage medium storing programming for execution by the one or more processors. The programming including instructions to configure the UE to receive a mobile subscriber identifier for the UE, the mobile subscriber identifier being exclusively assigned to the UE within a wireless tracking area of a network, and transmit, to a relay node, an initial message of an access procedure for accessing a user data service of the network, wherein the initial message comprises a request to connect to a control node of the network, and wherein the initial message includes the mobile subscriber identifier, and an indication that the initial message is associated with a first SRB for transmission to the control node.

Optionally, in any of the preceding embodiments, wherein the programming includes instructions to configure the UE to receive, from the relay node, a setup message on the first SRB.

Optionally, in any of the preceding embodiments, wherein the programming includes instructions to configure the UE to transmit, to the relay node, a setup complete message on a second SRB.

In accordance with an example embodiment, a relay node is provided. The relay node includes one or more processors, and a computer readable storage medium storing programming for execution by the one or more processors. The programming including instructions to configure the relay node to receive, from a control node of a network, an initial downlink message of an access procedure, wherein the initial downlink message is addressed in accordance with an identity of the relay node, wherein the initial downlink message includes a setup request to establish a connection between the control node and a remote device, and an indication that the initial downlink message is associated with a first SRB for transmission to the remote device, and send the setup request to the remote device.

Optionally, in any of the preceding embodiments, wherein the programming includes instructions to configure the relay node to receive, from the remote device, an initial uplink message of the access procedure, wherein the initial uplink message comprises a request to connect to the control node of a network, and wherein the initial uplink message includes a mobile subscriber identifier of the remote device, the mobile subscriber identifier being exclusively assigned to the remote device within a wireless tracking area of the network, and an indication that the initial uplink message is associated with a first SRB for transmission to the control node, and send, from the relay node to the control node, the initial uplink message to the control node in a second SRB.

Optionally, in any of the preceding embodiments, wherein the programming includes instructions to configure the relay node to receive, from the remote device, a secondary uplink message of the access procedure, wherein the secondary uplink message comprises a setup complete indicating completion of the access procedure.

In accordance with an example embodiment, a control node is provided. The control node includes one or more processors, and a computer readable storage medium storing programming for execution by the one or more processors. The programming including instructions to configure the control node to receive, from a relay device, a forwarded request to connect to the control node by a remote device, wherein the forwarded request is an initial message received by the control node in an access procedure, the forwarded request including mobile subscriber identifier being exclusively assigned to the remote device within a wireless tracking area of a network, and an indication that the forwarded request is associated with a first SRB for transmission from the remote device to the control node, and configure a context for the remote device in accordance with the mobile subscriber identifier.

Optionally, in any of the preceding embodiments, wherein the programming includes instructions to configure the control node to store the configured context for the remote device.

Optionally, in any of the preceding embodiments, wherein the programming includes instructions to configure the control node to send a control message from a media access control layer of the control node to a radio resource control layer of the control node, wherein the control message comprises the mobile subscriber identifier.

Practice of the foregoing embodiments enables the establishment of a context for a UE that is communicating with an access node using a relay device, even in situations where the UE is not physically identifiable by the access node as being distinct from the relay device (and therefore is not yet provided with a medium access control identity).

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

In various embodiments, an access procedure is performed so that a network control node may establish and store a context for a remote User Equipment (UE) that is communicating with the control node via a relay station. Illustrative embodiments support establishment of a UE context using a mobile subscriber identity to provide the advantage of allowing control node access even for a remote UE that is not is not physically identifiable by the control node as distinct from the relay node, and therefore is not yet able to receive a Medium Access Control (MAC) identity. Some embodiments of an access procedure without a MAC identity provide further advantages of lowering power consumption by reducing the required number of over-the-air messages. Other embodiments support contentionless context establishment for a remote UE to provide the advantages of reduced interference and reduced risk of losing contention for access to a shared medium.

Various combinations of dependent claims 3 and 4; 6, 7, 9, and 10; or 12, 14, 15, 16, and 17 are possible, for example.

Figure 1:
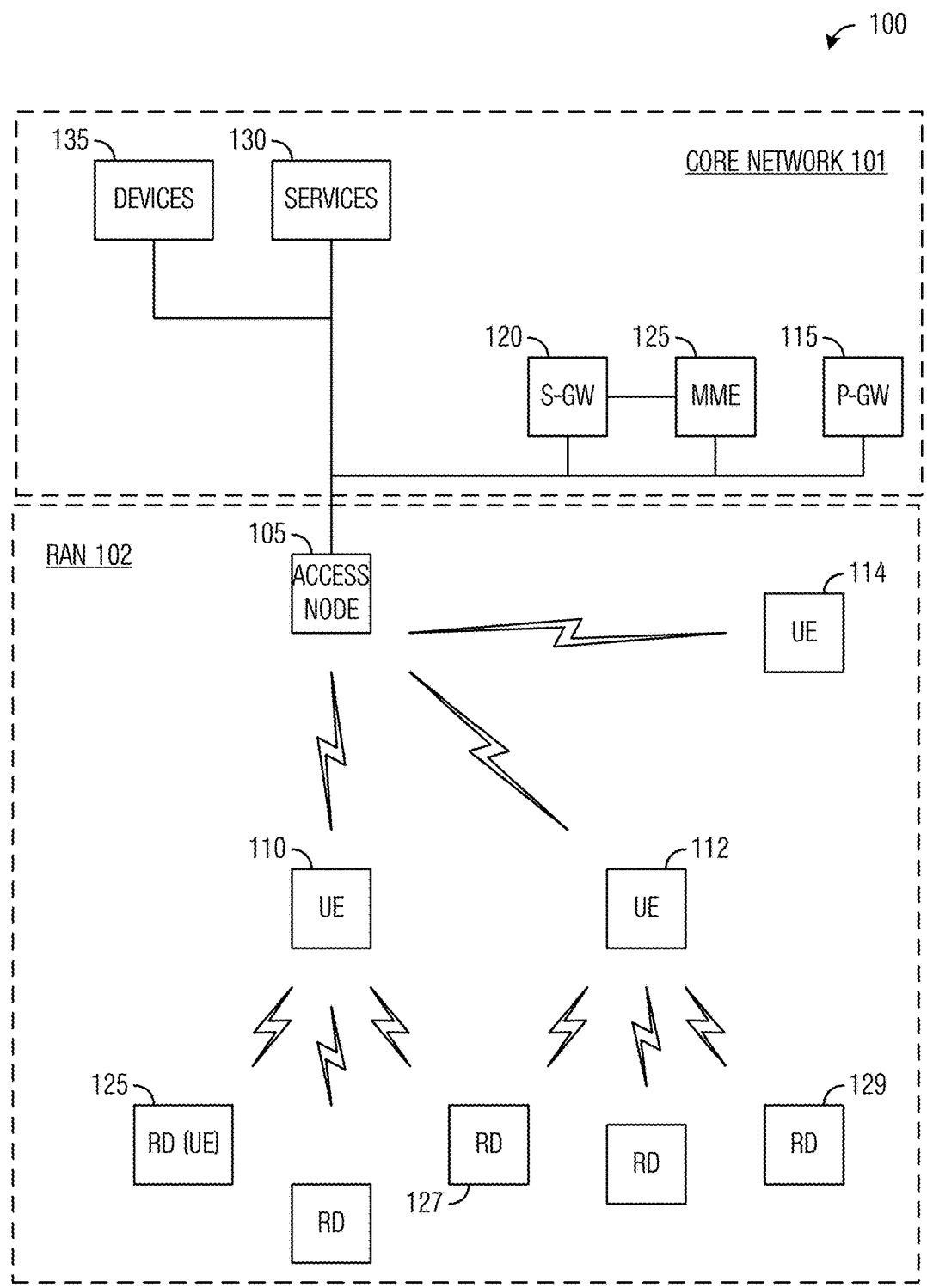
FIG. 1 illustrates an example wireless communications system according to example embodiments described herein.

FIG. 1 illustrates an example wireless communications system 100 that includes both a core network 101 and a radio access network (RAN) 102. RAN 102 includes an access node 105 serving a plurality of UEs, such as UE no, UE 112, and UE 114. In a cellular operating mode, communications to and from the plurality of UEs go through access node 105, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, and so on, while UEs may also be commonly referred to as mobile stations, mobiles, terminals, users, subscribers, stations, and the like. Examples of UEs include cellular phones, wireless tablets, laptop computers, etc. A separate radio network controller (RNC) that does not have base station functionality is another example of a control node or network controller, but the access node incorporates RNC functionality to reduce response times. Communications from an access node to a UE are commonly referred to as downlink communications, while communications from a UE to an access node are commonly referred to as uplink communications.

Core network 101 includes network entities such as a packet gateway (P-GW) 115 that provides interconnectivity between networks and a serving gateway (S-GW) 120 that provides entry and egress points for packets intended for users. Core network 101 also includes a mobility management entity (MME) 125, which performs mobility management functions such as, for example, choosing the S-GW for a UE, authenticating the UE, and checking its access permissions.

Wireless communications system 100 also includes a plurality of remote devices (RDs) within RAN 102, such as RD 127 and RD 129. The plurality of RDs includes a cellular handset functioning as a Remote UE 125, while the remaining RDs may include sensor devices, wearable devices, smart appliances, and so on. The term remote device (RD) may be used to refer to remote UEs, including remote devices that function as UEs but do not have the form factor or function of a conventional cellular handset (such as sensor devices, wearable devices, smart appliances, and so on). While it is understood that communications systems may employ multiple access nodes capable of communicating with a number of UEs, remote UEs, and other RDs, only one access node, one handset functioning as a remote UE, a number of other UEs, and a number of other RDs are illustrated for simplicity.

In some embodiments, the RDs may have limited connectivity options in terms of range. As an example, due to power consumption considerations, one or more of the RDs may not have medium to long range wireless connectivity, such as 3GPP LTE or LTE Advanced, longer-range IEEE 802.11 WiFi technologies, code division multiple access (CDMA), and the like. Further, even RDs that do support a longer range communications technology (such as, e.g., remote UE 125) may benefit from short-range signaling to improve power consumption and/or radio performance. Therefore, UEs in a wireless communications system may serve as relay devices to relay communications to and from the RDs. UEs may connect to RDs over short range connectivity, such as PC5, BlueTooth, ProSe, shorter-range IEEE 802.11 WiFi technologies, D2D, and so on, and they may forward packets between the RDs and remotely located services and/or devices. The UEs providing relay services may be referred to as relay UEs. Relay UEs may also operate as normal UEs. As an illustrative example, UE no serves as a relay device for remote UE 125 (which is operating as a RD in this instance) and RD 127, while UE 112 serves as a relay device for RD 127 and RD 129, providing connectivity between the RDs and remotely located services 130 and/or devices 135 by way of access node 105. While UE no is serving as a relay device for RDs, a user of UE no may also be using UE no for other activities, such as a voice call, as well as using a computer connected to the Internet utilizing hotspot services provided by UE no, for example.

A relay UE may provide relay services for one or more RDs, receiving protocol data units (PDUs) from the RDs and forwarding the received PDUs to the access node serving the relay UE, or receiving PDUs from the access node serving the UE and forwarding the received PDUs to respective RDs. In general, a PDU comprises a packet header and one or more packets, where the packet header includes information in a specified format that ensures the one or more packets reach the intended destination. In an embodiment, so that more than one RD may be supported by a single relay UE, the relay UE assigns a unique logical identifier to each RD.

Figure 2:
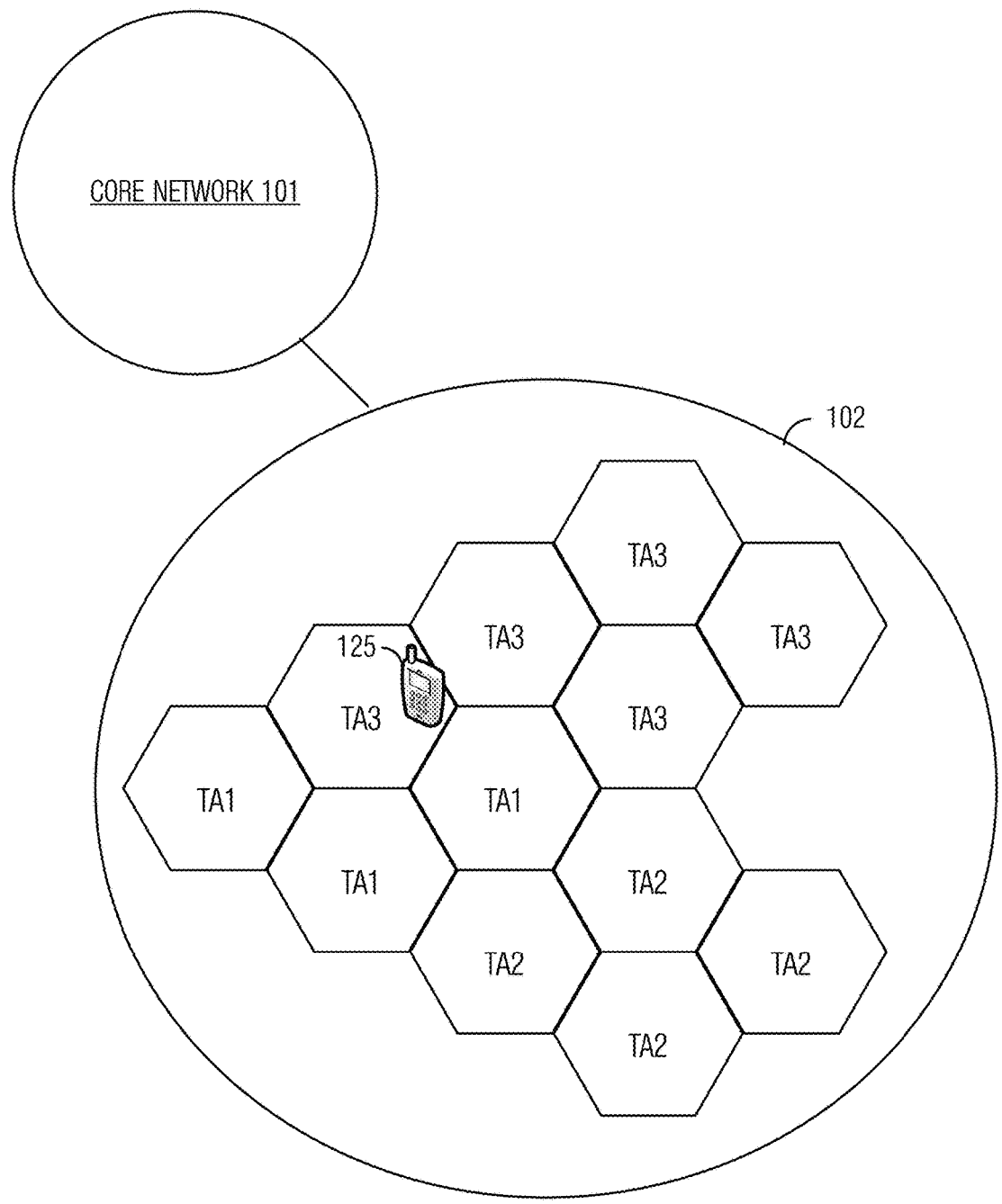
FIG. 2 illustrates example tracking areas in a wireless communications system according to example embodiments described herein.

FIG. 2 illustrates example wireless tracking areas (TAs) within RAN 102. RAN 102 is a cellular network made up of a number of cells. A TA is a set of wireless cells that are grouped together. For example, FIG. 2 shows cells grouped into three TAs: TA1, TA2, and TA3.

When a UE initially communicates with a RAN, for example when the UE powers on, the UE becomes associated with one or more TAs and receives a temporary mobile subscriber identity (TMSI) that is unique within the one or more associated TAs. A TMSI may also be referred to as a System Architecture Evolution (SAE) TMSI (S-TMSI), packet TMSI (P-TMSI), or the like. In the example of FIG. 2, when remote UE 125 powers on it is associated with TA3 of RAN 102 and receives a TMSI that is unique for TA3.

TA updates for a UE are performed periodically or when the UE moves to a TA that is not included in a TA list stored by the UE. During a TA update, the UE either maintains an association with a previous TA list or is associated with a current TA list. In the latter case, the UE may receive from the network a new TMSI that is unique for the current TA list.

In an embodiment using a SAE network such as 3GPP LTE or LTE-Advanced, the TMSI is a randomly assigned SAE-TMSI (S-TMSI). The S-TMSI is local to one or more associated TAs, and so it has to be updated each time the UE switches TAs, e.g., moves to a new geographical area. The network can also change the S-TMSI of the mobile at any time in order to, for example, avoid the UE subscriber from being identified and tracked by eavesdroppers on the radio interface.

TA updates involve messages between nodes of the core network 101 and the UE 125 that pass transparently through the RAN 102 without being processed by any destination node in the RAN 102. Where information sent from UE 125 is destined only for the core network 101, it is referred to as a Non-Access Stratum (NAS) communication, but if the information is destined for a node in the RAN 102 (e.g., communications from a UE to an eNB, communications between two UEs using user data services provided by an eNB, etc.) it is referred to as an Access Stratum (AS) communication.

Figure 3:
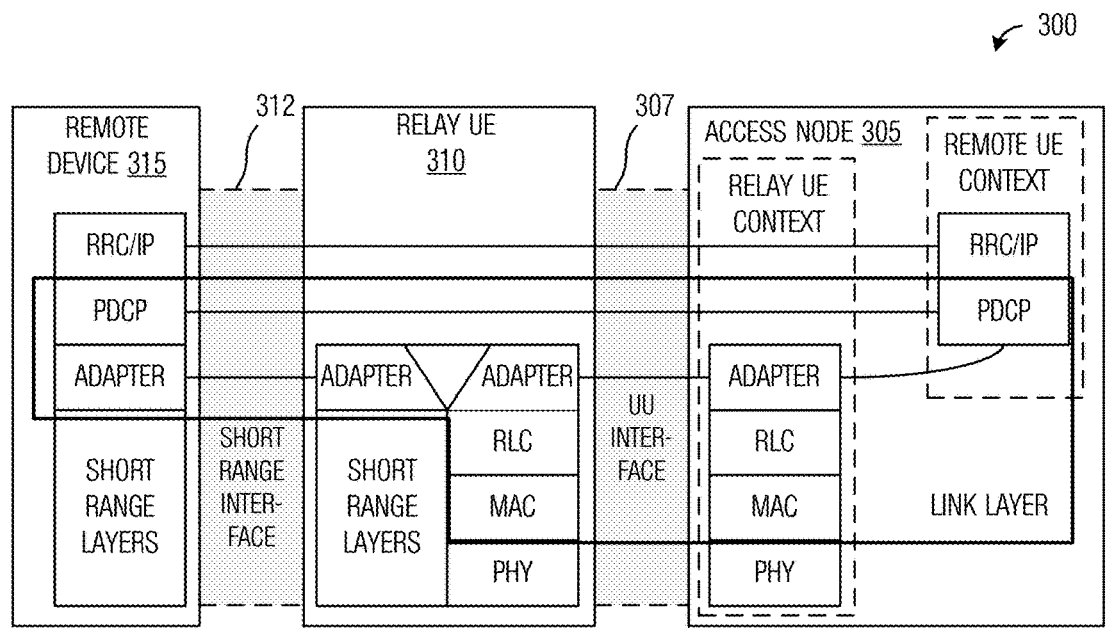
FIG. 3 illustrates a diagram of example protocol stacks and UE contexts for a wireless communications system supporting relay UEs and remote UEs according to example embodiments described herein.

FIG. 3 illustrates a diagram 300 of example protocol stacks and UE contexts for an embodiment wireless communications system supporting relay UEs and RDs. In the embodiment of FIG. 3, an access node 305 is connected to a relay UE 310 by a Uu interface 307. In other embodiments, any radio access device node with sufficient capacity, range, and connectivity to relay RD data may be used as a relay node in lieu of a relay UE, and a different network controller may be used instead of the access node.

Referring again to FIG. 3, relay UE 310 relays communications between access node 305 and a RD 315 that is connected to relay UE 310 by a short-range interface 312. Access node 305 is a control node that has a UE context established for both a RD and the relay UE. A UE context is a block of information in a network controller that is associated to one active UE. The block of information contains the necessary information required to maintain user data services for the active UE (i.e., communication of user data to and from the active UE). A UE context includes the identities of the UE-associated logical connection(s) from the control node to the UE, and may include, e.g., UE state information, security information, and UE capability information. It is noted that the structure of a UE context for the RD may be different from that of a UE context for the relay UE, e.g., the two contexts may include information relating to different protocol layers.

Before user data services can be provided to and from the UE, the UE context must be established by performing an access procedure, which is a set of messages between the UE and the control node that initiate and exchange the minimal information necessary to set up a user data connection between the control node and the UE. This minimal set of information includes a unique identity for the UE with respect to all other UEs serviced by the control node. In an embodiment, establishment of this UE context in the access node is a separate procedure that is performed after the RD has already registered in the tracking area with which it is currently associated and has already been assigned a TMSI. Such a UE that has a TMSI but no context in the access node is referred to as being in idle mode.

Referring again to FIG. 3, a physical (PHY) layer supporting a Uu interface 307 between access node 305 and relay UE 310 is shown, which is the first, or lowest layer of the seven-layer Open Systems Interconnection (OSI) model of computer networking. This carries out the low-level transmission and reception. In an embodiment, the physical layer has both Frequency division duplex (FDD) and Time division duplex (TDD) modes of operation. In a multi-antenna embodiment, Space Division Multiple Access (SDMA) may be used at the physical layer. However, other modes of operation are possible.

Referring again to FIG. 3, short range layers that support a short range interface 312 between RD 315 and relay UE 310 are also shown. The short range layers could be layers using, for example, PC5, Bluetooth, WiFi Direct, etc. A Radio Resource Control (RRC)/Internet Protocol (IP) layer is also shown in FIG. 3. The RRC/IP layer represents an RRC layer in the control plane and an IP layer in the user plane, in each case comprising the layer of the protocol stack immediately above the PDCP layer. The RRC/IP layer is the layer at which data is assembled into messages or packets along with header addressing that may indicate the ultimate destination of these packets. The messages or packets in this RRC/IP layer may be referred to as PDUs of the RRC/IP layer and are transported via the Packet Data Convergence Protocol (PDCP), which performs functions such as IP packet header compression.

Referring again to FIG. 3, several sublayers of a link layer (i.e., level 2 OSI layer) are also shown. These sublayers include, in ascending order, a MAC sublayer, a Radio Link Control (RLC) sublayer, a PDCP adapter sublayer, and a PDCP sublayer. In an embodiment, the PDCP adapter sublayer is responsible for connecting the cellular PDCP sublayer to the lower transport layers, and for maintaining on Uu interface 307 the needed routing and identification information of RD 315. The RLC sublayer manages the radio link between the mobile and the network by, for example, optionally re-transmitting data packets that have not been received correctly. The MAC sublayer of the link layer carries out low-level manipulation and control of the PHY layer. For example, MAC protocols prioritize the transmission of different data streams from a UE or access node to ensure that each one has an appropriate data rate. More details on the MAC sublayer are provided in 3GPP TS 36.321 V13.2.0, which is incorporated herein by reference in its entirety. It is noted that the MAC and RLC sublayers may support a Uu interface 307 between access node 305 and relay UE 310, while the PDCP sublayer may support communication between access node 305 and remote device 315.

More generally, the link layer that contains these sublayers is the protocol layer that transfers data between adjacent network nodes via logical channels known as radio bearers. These logical channels are offered by the link layer to higher layers for the transfer of either user data or control data. When a radio bearer is used for control data, it is referred to as a signaling radio bearer (SRB).

Protocols of the link layer (i.e., data link protocols) do not include inter-network routing and global addressing, which are higher-layer functions. This division of labor allows data-link protocols to focus on local delivery, addressing, and media arbitration. Examples of data link protocols are Ethernet for local area networks (multi-node), the Point-to-Point Protocol (PPP), High-level Data Link Control (HDLC) and Advanced Data Communication Control Protocol (AD-CCP) for point-to-point (dual-node) connections.

Media arbitration in the link layer involves arbitrating between parties contending for access to a medium connecting two nodes, without concern for the ultimate destination of communications. When devices attempt to use a medium simultaneously, frame collisions occur. Data-link protocols specify how devices detect and recover from such collisions, and may provide mechanisms to reduce or prevent them.

In an embodiment, a contentionless access procedure is used to establish a UE context where there is not a significant enough danger of collisions to warrant use of media arbitration in the link layer. For example, the access node may already have radio resources allocated for the Uu interface between it and the relay UE. In this situation, there is minimal risk of collisions on the Uu interface, on which communications are also to be relayed between the access node and the RD. Thus, a contentionless access procedure could be used to establish the context for the RD, meaning that the access procedure would not require any additional media arbitration by the link layer in the access node or in the relay UE.

When such a contentionless access procedure is used, it may be possible to bypass one or more link layer protocols which would not be required to perform any additional processing for the access procedure. In an embodiment, messages from the RD may be passed within the relay UE directly from the PHY layer to the RRC/IP layer, bypassing all or part of the link layer. In an embodiment, messages may be passed within the access node directly from the MAC sublayer to the RRC/IP layer, bypassing the protocols of the RLC sublayer. Such bypassing of a link layer protocol is referred to as transparent operation of a link layer protocol. Link layer protocols that may be bypassed include, e.g., segmentation, reassembly, sequence number and duplicate detection, acknowledgment, and retransmission protocols.

In an embodiment, the MAC sublayer protocols of the link layer may be set to their default values in the access node and/or relay UE during transparent operation of the link layer. In such an embodiment, an access procedure for a RD could be performed without assignment of a MAC identity, which may reduce the risk of contention, reduce interference, and increase power efficiency.

Figure 4:
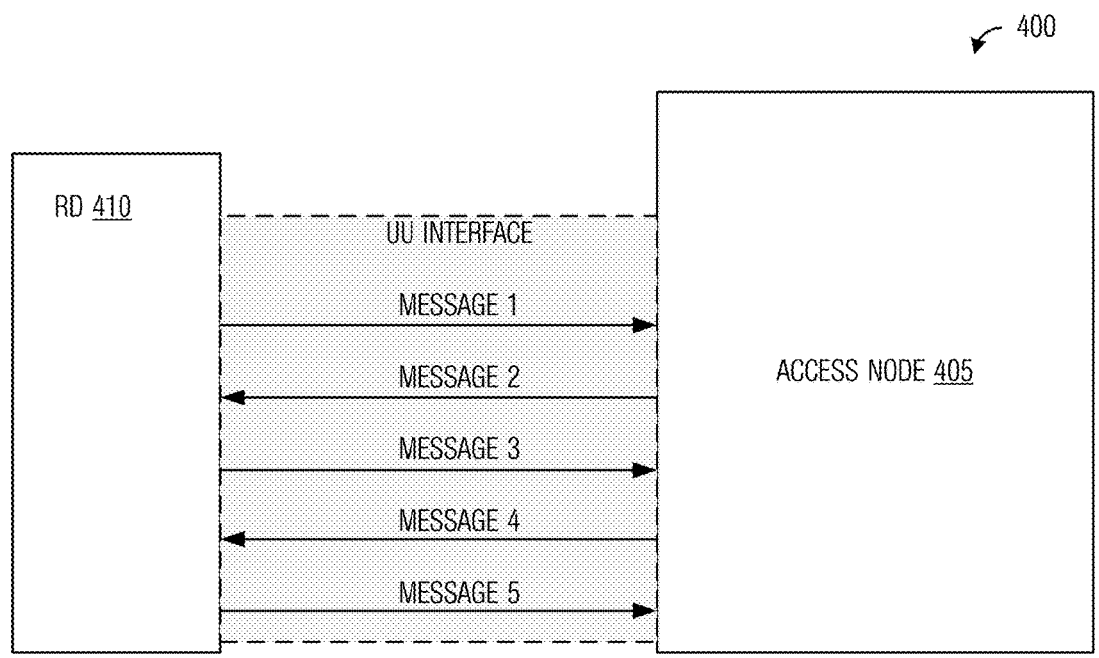
FIG. 4 illustrates messages exchanged between devices during an exemplary random access channel (RACH) eNB access procedure.

To highlight the benefits of performing the RD access procedure without contention and without assignment of a MAC identity, a contrary example is presented in diagram 400 of FIG. 4 in the form of a random access channel (RACH) access procedure. This RACH access procedure features both contention and assignment of a MAC identity. In this example, it is assumed a RD 410 is able to operate as a normal UE communicating directly with an access node 405 over a shared medium in the Uu interface.

The example RACH access procedure of FIG. 4 uses a sequence of five transmissions. For initial access these transmissions include uplink Message 1, downlink Message 2, uplink Message 3, downlink Message 4, and uplink Message 5. Message 1 sends the choice of communications preamble from RD 410 to access node 405, and RD 410 is identified to access node 405 by time slot number in which the preamble is sent. This time slot number will be used by access node 405 and RD 410 as a MAC identity for message 2. For example, message 2 may be identified as being intended for RD 410 based on its transmission timing relative to the time slot number in which the preamble is sent. Message 2 is a Random Access Response (RAR), populated and sent by access node 405 that terminates in the MAC layer. Message 2 provides RD 410 an ephemeral version of a cellular radio network temporary identifier (C-RNTI), also referred to as a temporary C-RNTI, which is a temporary but unique access stratum identifier among all UEs served by access node 405, and which may be later promoted to a more permanent access stratum identifier for RD 410. In the example of FIG. 4, the temporary C-RNTI may be used for MAC addressing of a MAC layer in the Uu interface directly connecting access node 405 and RD 410.

Referring again to FIG. 4, Message 3 of the example RACH access procedure is sent by RD 410 to access node 405. Message 3 contains the temporary C-RNTI and an additional identifier, which is either a random number or the UE's TMSI that RD 410 was assigned by the network when it registered with the current tracking area. Both these identifiers are used in case the temporary C-RNTI of RD 410 is not unique due to multiple access requests occurring at the same time, because in this step RD 410 is competing with other UEs for contention-based access to access node 405. A random number referred to as a contention resolution identity may also be sent instead of the TMSI. In some cases, the temporary C-RNTI of RD 410 may be sent in a MAC layer portion of Message 3, while the additional identifier may be sent in an RRC layer portion of Message 3. Message 4 is a message from access node 405 to RD 410, which in the example RACH access procedure of FIG. 4 uses the TMSI or contention resolution identity for contention resolution and also sets up a radio configuration. If RD 410 wins the contention, Message 4 will echo back the TMSI of RD 410 or the random number of RD 410, and will also include a more permanent C-RNTI to be used for further communications between RD 410 and access node 405. Message 5 is a scheduled transmission on the uplink, which contains a NAS message that will be used as the initial UE message for network mobility management. The scheduled NAS message may be, for example, a service request, network attach request, tracking area update, etc.

It should be appreciated that the procedure of FIG. 4 is shown as taking place over a Uu interface between RD 410 and access node 405, i.e., in this example RD 410 is not assumed to be functioning as a remote UE served by a relay UE. If RD 410 is served by a relay UE, for example according to the protocol stacks of FIG. 3, the procedure of FIG. 4 cannot be carried out, due to the lack of a MAC sublayer between access node 405 and RD 410.

Figure 5:
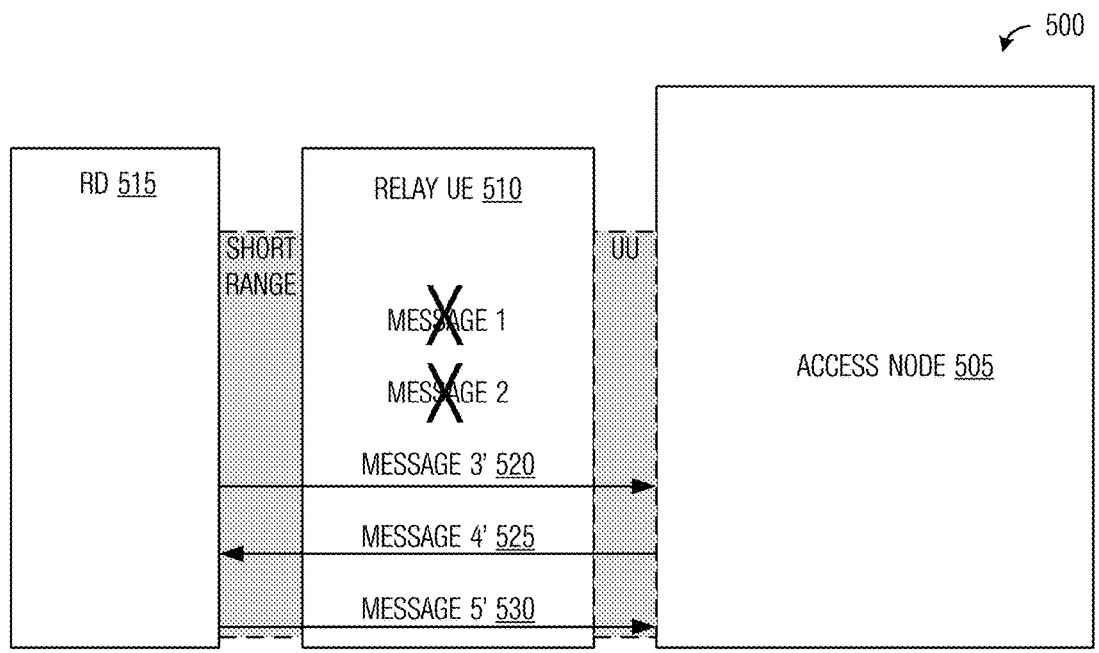
FIG. 5 illustrates messages exchanged between devices during an alternative eNB access procedure according to example embodiments described herein.

FIG. 5 shows a diagram 500 of messaging that takes place during an embodiment access procedure that, unlike the example RACH procedure of FIG. 4, is contentionless and does not require assignment of a MAC identity. Messages 1 and 2 of the example RACH procedure (shown in FIG. 4) are skipped in the embodiment access procedure of FIG. 5, because forwarding one or both of these lower layer messages would break the relaying protocol model in which there is neither any MAC layer between an access node 505 and RD 515 nor any MAC identity or time slot number by which to address a RD that accesses access node 505 only by a relay UE 510. Forwarding these messages could also result in decreased band efficiency and higher power consumption. Instead, a modified version of Message 3 of FIG. 4, referred to as Message 3' 520, is both the initial message overall as well as the initial uplink message of the access procedure of FIG. 5. Message 3' 520 is referred to as an RRCConnectionRequest message, and this message has been modified from Message 3 of FIG. 4 to identify the UE by TMSI but not by any C-RNTI. In an embodiment, no C-RNTI is included in Message 3' 520. In an embodiment, Message 3' 520 may exclude a MAC layer portion of Message 3.

Referring again to FIG. 5, Message 3' 520 is modeled as being transmitted from RD 515 to access node 505 on a logical channel which is associated with an SRB characterized by transparent operation of the RLC protocols of the link layer. In an embodiment, this transparent operation of link layer protocol(s) allows bootstrapping a new SRB where none has yet been set up between RD 515 and access node 505. This transparent mode SRB is referred to as SRB0. By contrast, on the portion of the path between RD 515 and access node 505 that makes up the Uu interface, Message 3' 520 may be forwarded by relay UE 510 on a different SRB that does not use transparent mode. For example, Message 3' 520 may be forwarded on an SRB designated as SRB1. Message 4' 525 is referred to as an RRCConnectionSetup message for RD 515 and is the initial downlink message of the access procedure of FIG. 5. Message 4' 525 is addressed on the Uu interface to RD 515 with forwarding information provided above the MAC sublayer (e.g., at the PDCP sublayer). Similarly to Message 3' 520, Message 4' 525 is sent on an existing SRB for relay UE 510, e.g., SRB1, but it is modelled as being on the transparent mode logical channel SRB0 for RD 515. Message 4' 525 includes a PDU with a header that indicates SRB0 as the bearer corresponding to the logical channel. When sent to relay UE 510 by access node 505, the header also includes a logical identity of RD 515 relative to relay UE 510. In an embodiment, Message 4' 525 does not provide information about the physical layer configuration, and the MAC layer configuration for RD 515 to access node 505 connection is set to default. Neither the MAC layer configuration nor the physical layer configuration are meaningful for a connection between RD 515 and access node 505, because once the access procedure is completed, this RD/access node connection will reside on the connections between RD 515 and relay UE 510 and between relay UE 510 and access node 505.

The uplink Message 5' 530, which is the final message of the access procedure, is referred to as the RRCConnectionSetupComplete message. In an embodiment, Message 5' 530 is associated with a first SRB from RD 515 and forwarded on an existing SRB by relay UE 510, where neither of these SRBs operate in RLC transparent mode. For example, SRB1 for RD 515 may be indicated in the header of Message 5' 530 between RD 515 and relay UE 510, while SRB1 for relay UE 510 is used between relay UE 510 and access node 505. In an embodiment, no UE identity information is passed in the AS layers in Message 5' 530.

After Message 5' 530 has been sent, the access procedure is complete and access node 505 will have been able to configure and store a context for RD 515 to provide it services such as, e.g., user data services. In some cases, this may be a newly established context for RD 515 at access node 505, while in other cases, a context may already exist for RD 515 so that the access procedure only modifies an existing context stored by access node 505. The stored context may be stored either locally or remotely by access node 505. In some embodiments, after the access procedure is complete access node 505 may later assign a C-RNTI to RD 515 using a handover mechanism, such as, e.g., sending an LTE mobilityControlInfo information element to the remote UE to assign the C-RNTI.

Figure 6:
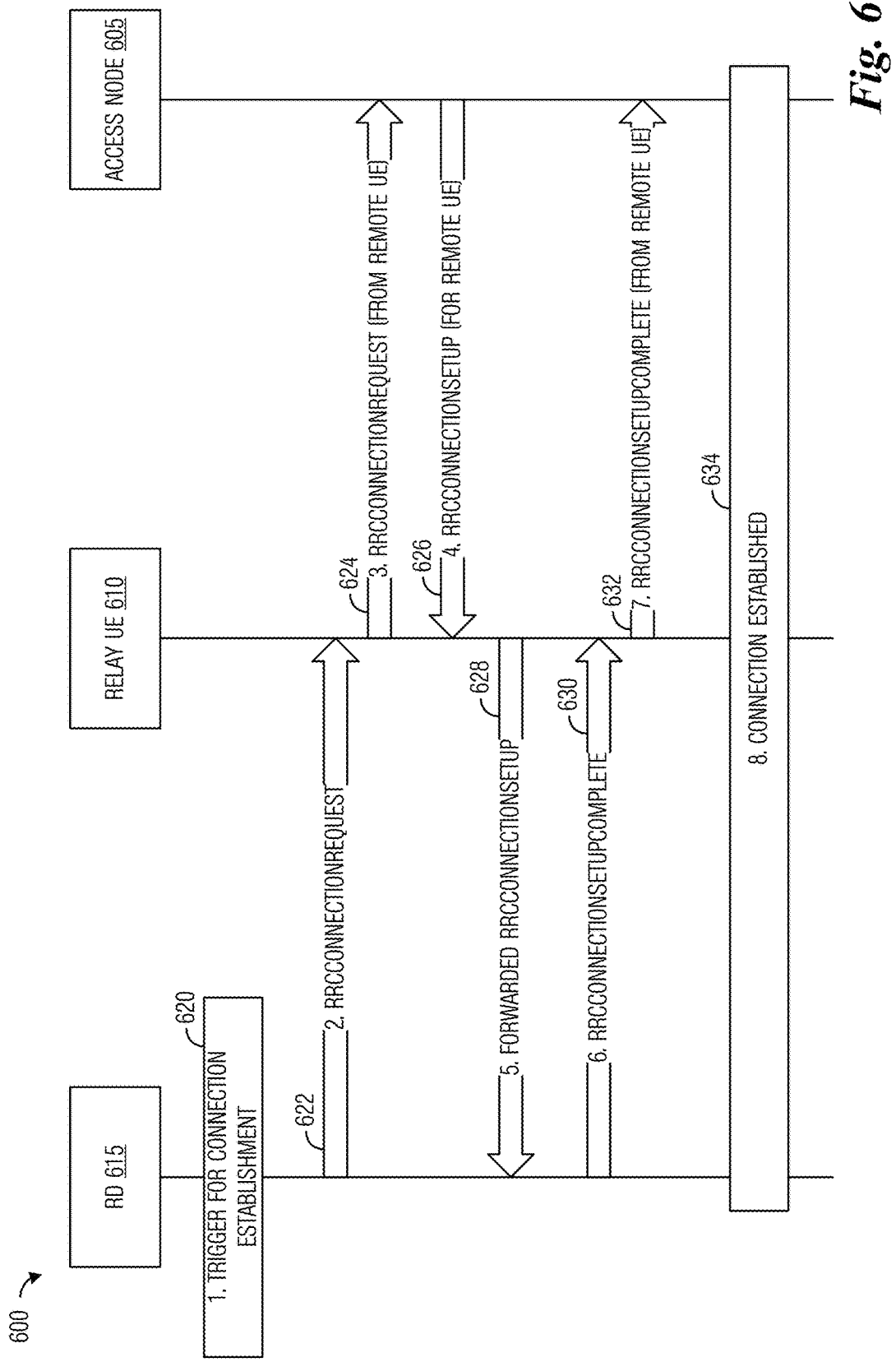
FIG. 6 illustrates a message flow diagram highlighting messages exchanged between devices and operations performed by the devices during the eNB access procedure of FIG. 5, according to example embodiments described herein.

FIG. 6 illustrates a message flow diagram 600 highlighting messages exchanged between devices (including an access node 605, a relay UE 610, and an RD 615) and operations performed by the devices during an embodiment contentionless access node access procedure. At step 1 620, RD 615 is triggered for connection establishment by, for example, arrival of data at RD 615, a user pressing a "send" button, a page from relay UE 610, etc. At step 2 622, an RRCConnectionRequest (Message 3') is sent from RD 615 to relay UE 620 on the short range interface. At step 3 624, the RRCConnectionRequest from RD 615 is sent from relay UE 610 to access node 605. At step 4 626, an RRCConnectionSetup message (Message 4') for RD 615 is sent from access node 605 to relay UE 610. At step 5 628, the RRCConnectionSetup message is forwarded from relay UE 610 to RD 615. At step 6 630, an RRCConnectionSetupComplete message (Message 5') is sent from RD 615 to relay UE 610. At step 7 632, the RRCConnectionSetupComplete message from RD 615 is sent from relay UE 610 to access node 605. At step 8 634, a connection is established between RD 615, relay UE 610, and access node 605.

Figure 7:
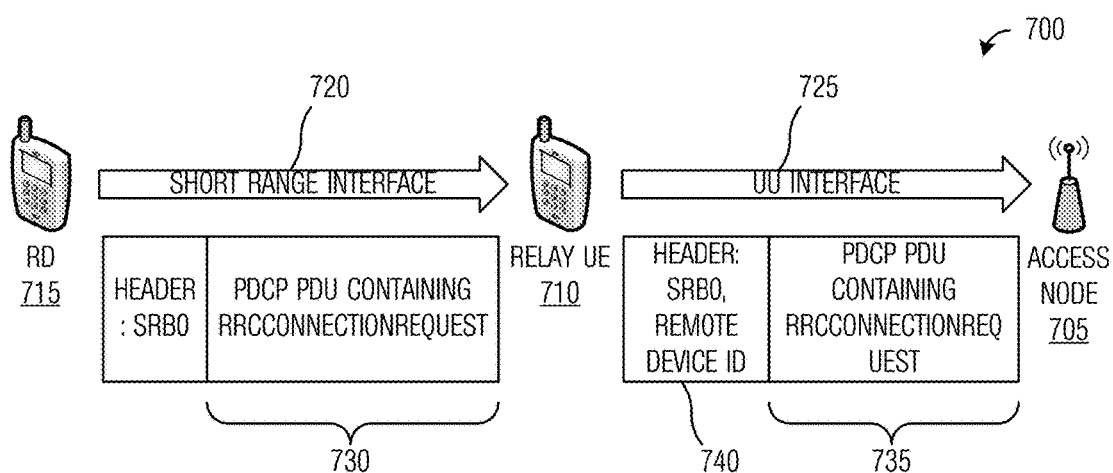
FIG. 7 illustrates a message flow diagram highlighting messages exchanged between devices during an initial message of the eNB access procedure of FIG. 5, according to example embodiments described herein.

FIG. 7 illustrates a diagram 700 of the embodiment RRCConnectionRequest of Message 3' in greater detail. On a short-range interface 720 between RD 715 and relay UE 710, the message has a PDU 730 of a forwarding layer protocol (e.g., PDCP), together with a header which indicates that SRB0 is to be the bearer used for transmission of the RRCConnectionRequest from RD 715 to access node 705. On a Uu interface 725 between relay UE 710 and access node 705, the message includes the forwarded PDU 735 with a header 740. Header 740 indicates that SRB0 is used for transmission from RD 715 to access node 705. Header 740 also includes the logical identity of RD 715 as maintained by relay UE 710 (e.g., "this is relay device #2"), so access node 705 can address RD 715 for forwarding in the future. The RRCConnectionRequest PDU contains the TMSI as a UE identifier, which assumes RD 715 is registered in the TA of the current cell. An establishment cause field of the PDU indicates the cause that triggered the access procedure.

Figure 8:
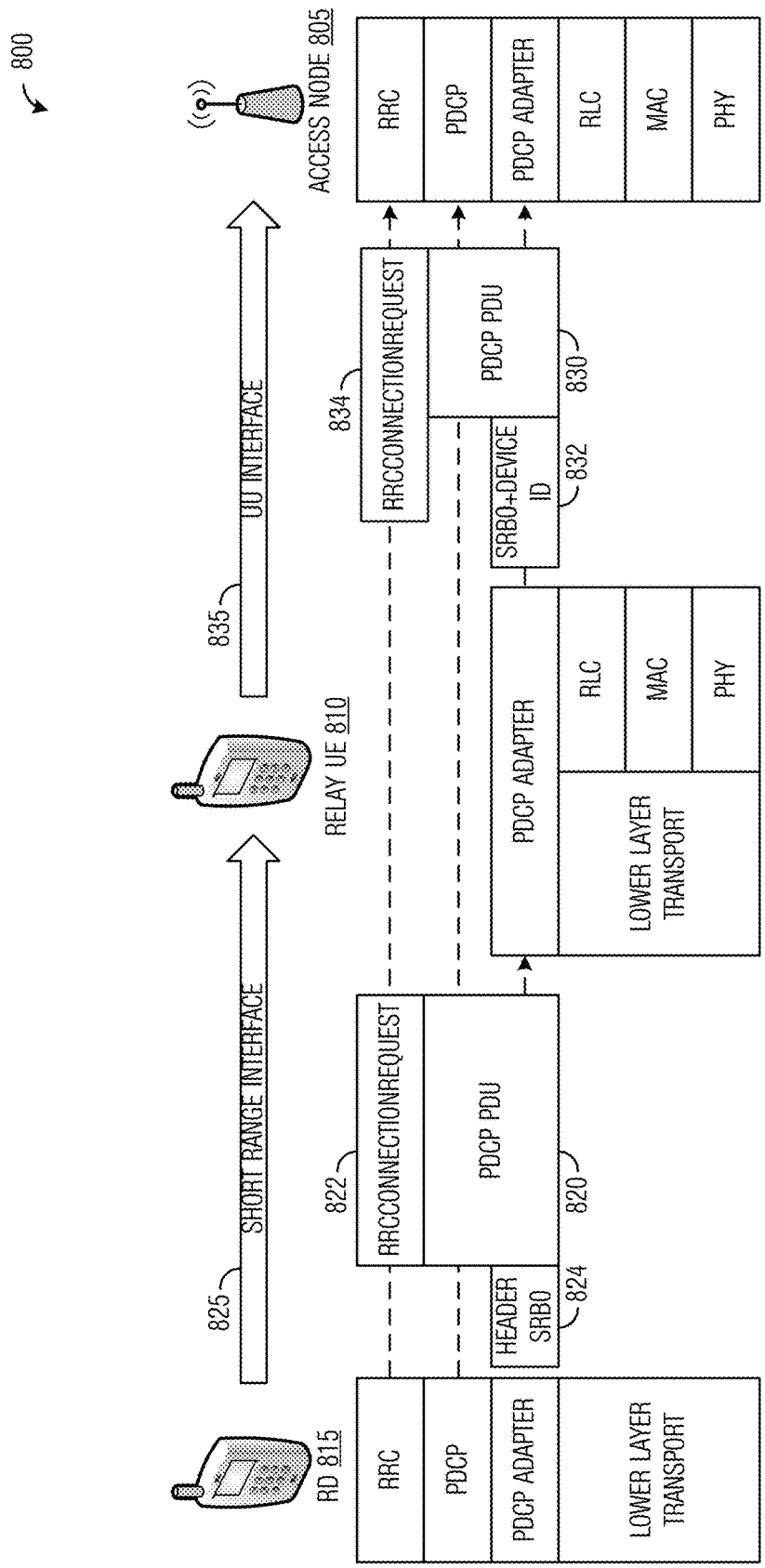
FIG. 8 illustrates a diagram of example protocol stacks for the message flow diagram of FIG. 7 according to example embodiments described herein.

FIG. 8 illustrates a diagram 800 highlighting the interaction of protocol stacks in the devices (including an access node 805, a relay UE 810, and an RD 815) to forward the embodiment RRCConnectionRequest of FIG. 7. The RRC, PDCP, and PDCP adapter sublayers of RD 815 are used to send a first PDCP PDU 820 over the short range interface 825 to relay UE 810 without modification of the short-range interface lower transport layers. Encryption of the RRCConnectionRequest message (not shown) takes place in the PDCP sublayer of the remote UE. First PDCP PDU 820, sent over the short range interface, includes an RRCConnectionRequest 822 in the RRC layer, and the message also includes a header 824 (which is associated with first PDCP PDU 820) in the PDCP adapter sublayer indicating that SRB0 is the radio bearer.

Relay UE 810 receives the first PDCP PDU 820 from the short range interface 825 and processes the header in PDCP adapter sublayer. Relay UE 810 sends a second PDCP PDU 830 over Uu interface 835 to access node 805. It is noted that second PDCP PDU 830 is the same as first PDCP PDU 820, but forwarded on a different interface. In the PDCP adapter sublayer, a header 832 for second PDCP PDU 830, resulting from the processing of header 824 (associated with first PDCP PDU 820), indicates SRB0 as the radio bearer, and also includes the device ID (i.e., a logical identity) of RD 815. Second PDCP PDU 830 also includes forwarded RRCConnectionRequest 834 in the RRC layer. Relay UE 810 lower layer transport layers, including RLC, MAC, and PHY layers, are not involved in processing RRCConnectionRequest 834 to create the second PDU with its header.

Access node 805 receives second PDCP PDU 830 from Uu interface 835 and processes header 832 in the PDCP adapter sublayer to determine which PDCP entity should be used for second PDCP PDU 830. Access node 805 then processes PDCP PDU 830 in the PDCP sublayer to reconstruct RRCConnectionRequest 834, which is then processed in the RRC layer.

Figure 9:
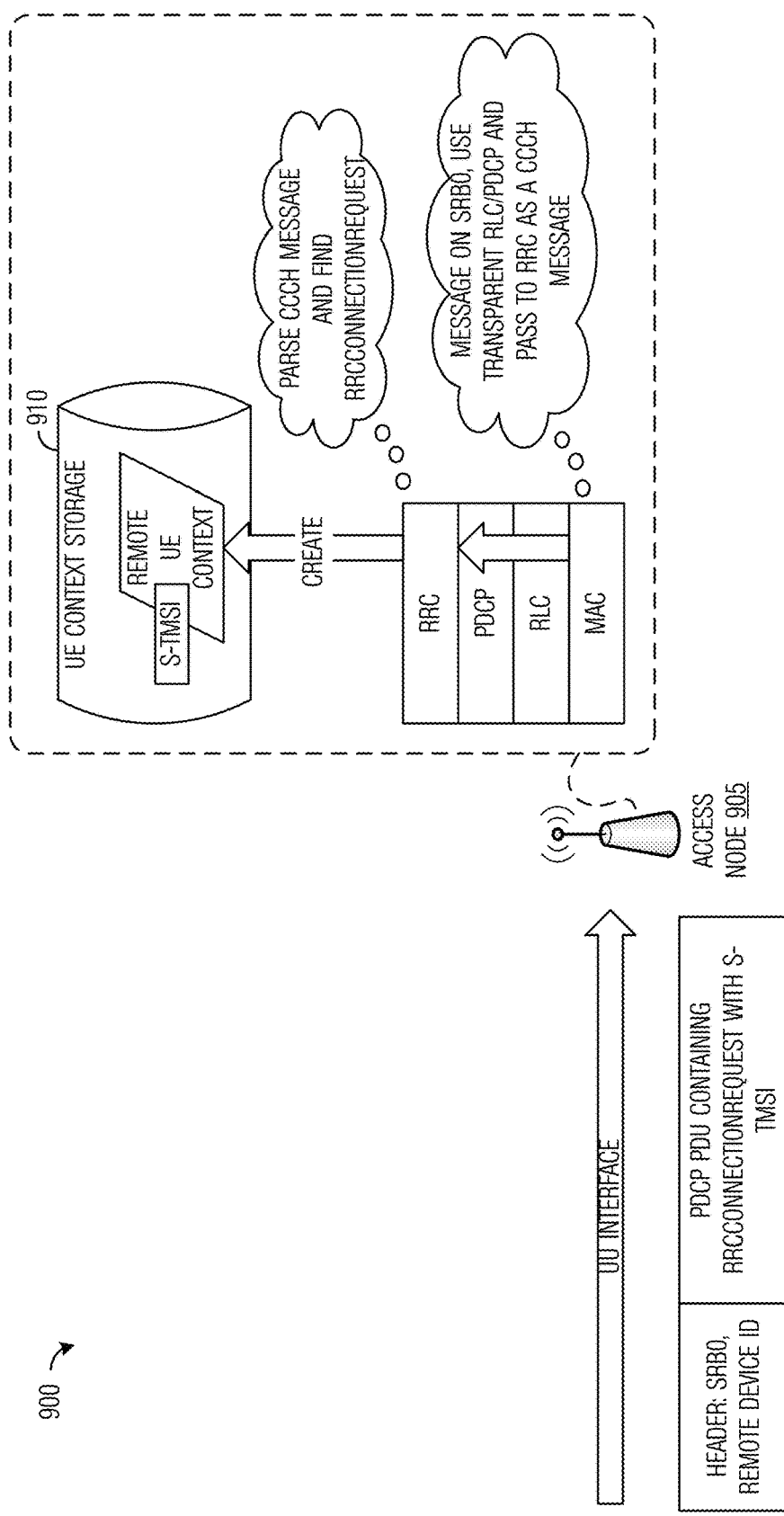
FIG. 9 illustrates a message flow diagram of example operations occurring in an eNB when receiving the initial message of the access procedure of FIG. 7, according to example embodiments described herein.

FIG. 9 illustrates a diagram 900 highlighting the handling of the embodiment RRCConnectionRequest of FIG. 8 after it arrives at access node 905. Access node 905 recognizes the RRCConnectionRequest as being forwarded, based on the header information provided by the relay UE that indicates SRB0 and the logical identity of the RD. This information triggers the establishment of an AS context for the remote UE by access node 905, even though the RD has no associated C-RNTI for access node 905 to use as the identifying value for such a context. The UE identification needed for the establishing the UE context is instead provided by the TMSI that was included in the RRCConnectionRequest message.

Referring again to FIG. 9, inside access node 905, the MAC sublayer sends a control message associated with radio bearer SRB0 to the RRC layer, and this control message may be, as in the example embodiment of FIG. 9, a Common Control Channel (CCCH) message sent on a dedicated logical channel from MAC to upper layers. This CCCH message includes the RRCConnectionRequest payload and passes transparently through the RLC/PDCP sublayers. The RRC layer parses the CCCH message and finds the forwarded RRCConnectionRequest payload. Access node 905 attempts to create a UE context for the RD based on the S-TMSI in the RRCConnectionRequest, and to store this UE context in a UE context storage 910 of access node 905.

In an embodiment, the RD must have a local registration before the access node can successfully establish and store the UE context of the RD so that AS services can be provided to the RD through the relay UE. If the RD is not registered in the current TA, i.e., the TA that includes the serving access node, then the TMSI would not be meaningful in the current cell and could even collide with the TMSI of another UE. A RD that has been on the current cell before "joining" the relay UE will have already performed a tracking area update already while on the Uu interface. For a RD that has arrived by "group handover" with the relay UE, the group handover must include a tracking area update for the RD.

Figures 10, 11:
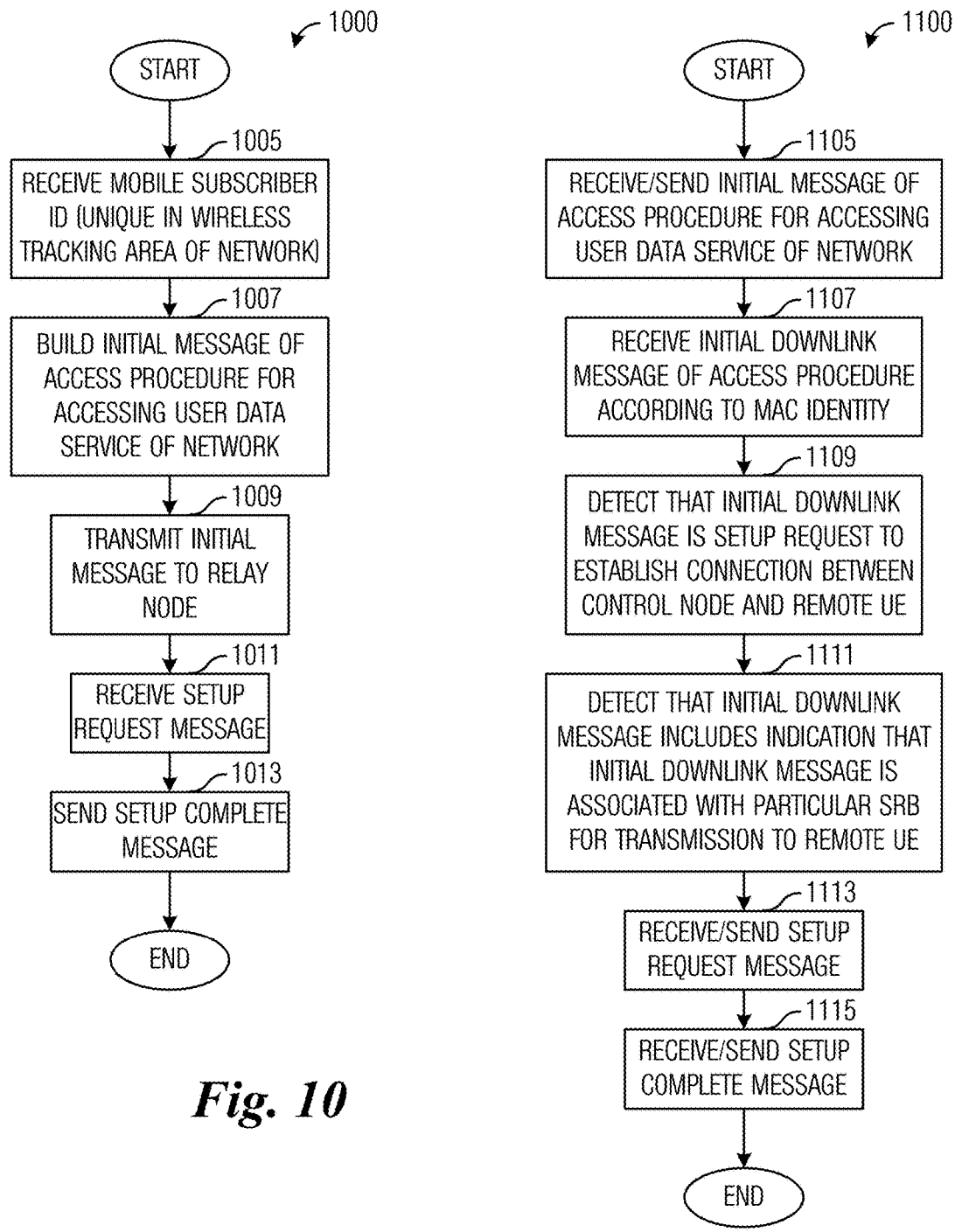
FIG. 10 illustrates a flow diagram of example operations occurring in a remote UE during an access procedure, according to example embodiments described herein.
FIG. 11 illustrates a flow diagram of example operations occurring in a relay UE during a remote UE access procedure, according to example embodiments described herein.

FIG. 10 is a flow diagram for an embodiment method 1000 for operating a RD to send an initial message (e.g., Message 3' of FIG. 5) in a RD access procedure. At step 1005, the RD receives from a network a mobile subscriber identifier for the RD that is unique within the wireless tracking area of the network. At step 1007, the RD builds an initial message of an access procedure for accessing a user data service of the network. This initial message comprises a request to connect to a control node of the network (i.e., an access node or other network controller). The initial message includes the mobile subscriber identifier and an indication that the initial message is associated with a first SRB for transmission to the control node. At step 1009, the access node transmits the initial message to a relay node such as, for example, a relay UE. At step 1011, the RD receives a setup request message. At step 1013, the RD sends a setup complete message.

FIG. 11 is a flow diagram for an embodiment method 1100 for operating a relay node to receive an initial downlink message (e.g., Message 4' of FIG. 5) in a RD access procedure. At step 1105, the relay node, which may be, e.g., a relay UE, receives and sends an initial message of an access procedure for accessing user data services of a network. At step 1107, the relay node receives an initial downlink message of the access procedure in accordance with a MAC identity of the relay device. At step 1109, the relay node detects that the initial downlink message comprises a setup request to establish a connection between a control node and a RD. At step 1111, the relay node detects that the initial downlink message includes an indication that the initial downlink message is associated with a particular SRB for transmission to the RD. At step 1113, the relay node receives and sends a setup request message. At step 1115, the relay node receives and sends a setup complete message.

Figure 12:
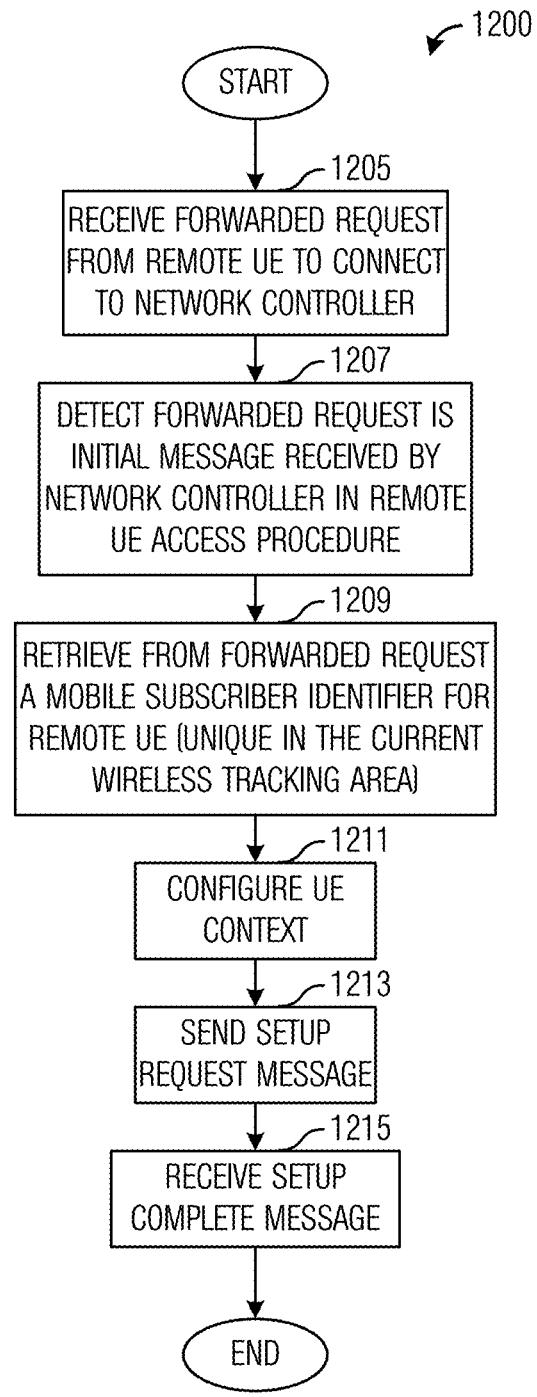
FIG. 12 illustrates a flow diagram of example operations occurring in an eNB during a remote UE access procedure, according to example embodiments described herein.

FIG. 12 is a flow diagram for an embodiment method 1200 for operating a network controller to receive an initial message (e.g., Message 3' of FIG. 5) in a RD access procedure. At step 1205, the network controller, which may be, for example, an access node, receives a forwarded request to connect to the network controller by a RD. The forwarded request includes an indication that the forwarded request is associated with a first signaling radio bearer (SRB) for transmission from the RD to the network controller. At step 1207, the network controller detects that the forwarded request is an initial message received by the network controller in a RD access procedure. At step 1209, the network controller retrieves from the forwarded request a mobile subscriber identifier for the RD that is unique relative to the current tracking area. At step 1211, the network controller configures a context for the UE in accordance with the mobile subscriber identifier. At step 1213, the network controller sends a setup request message. At step 1215, the network controller receives a setup complete message.

Figure 13:
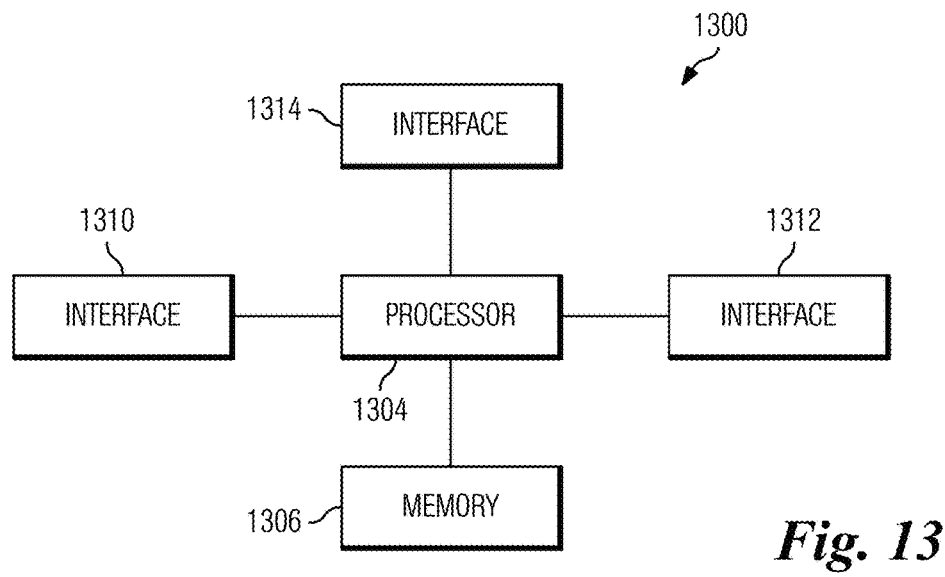
FIG. 13 illustrates a block diagram of an embodiment processing system for performing methods described herein.

FIG. 13 illustrates a block diagram of an embodiment processing system 1300 for performing methods described herein, which may be installed in a host device. As shown, the processing system 1300 includes a processor 1304, a memory 1306, and interfaces 1310-1314, which may (or may not) be arranged as shown in FIG. 13. The processor 1304 may be any component or collection of components adapted to perform computations and/or other processing related tasks, and the memory 1306 may be any component or collection of components adapted to store programming and/or instructions for execution by the processor 1304. A means for configuring a context for a UE may include processor 1304. In an embodiment, the memory 1306 includes a non-transitory computer readable medium. The interfaces 1310, 1312, 1314 may be any component or collection of components that allow the processing system 1300 to communicate with other devices/components and/or a user. For example, one or more of the interfaces 1310, 1312, 1314 may be adapted to communicate data, control, or management messages from the processor 1304 to applications installed on the host device and/or a remote device. As another example, one or more of the interfaces 1310, 1312, 1314 may be adapted to allow a user or user device (e.g., personal computer (PC), etc.) to interact/communicate with the processing system 1300. The processing system 1300 may include additional components not depicted in FIG. 13, such as long term storage (e.g., non-volatile memory, etc.).

In some embodiments, the processing system 1300 is included in a network device that is accessing, or part otherwise of, a telecommunications network. In one example, the processing system 1300 is in a network-side device in a wireless or wireline telecommunications network, such as a base station, a relay station, a scheduler, a controller, a gateway, a router, an applications server, or any other device in the telecommunications network. In other embodiments, the processing system 1300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 14:
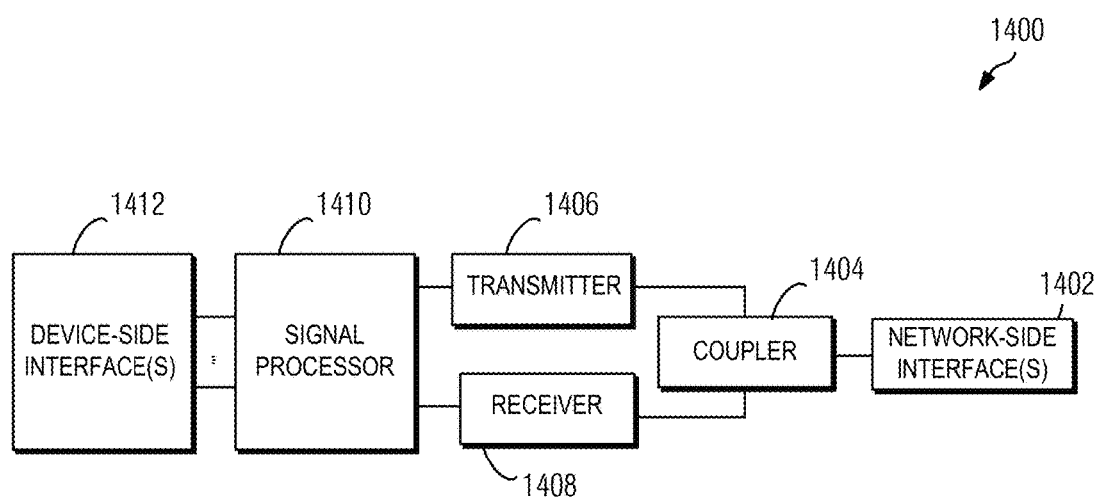
FIG. 14 illustrates a block diagram of a transceiver adapted to transmit and receive signaling over a telecommunications network according to example embodiments described herein.

In some embodiments, one or more of the interfaces 1310, 1312, 1314 connects the processing system 1300 to a transceiver adapted to transmit and receive signaling over the telecommunications network. FIG. 14 illustrates a block diagram of a transceiver 1400 adapted to transmit and receive signaling over a telecommunications network. The transceiver 1400 may be installed in a host device. As shown, the transceiver 1400 comprises a network-side interface 1402, a coupler 1404, a transmitter 1406, a receiver 1408, a signal processor 1410, and a device-side interface 1412. The network-side interface 1402 may include any component or collection of components adapted to transmit or receive signaling over a wireless or wireline telecommunications network. The network-side interface 1402 may also include any component or collection of components adapted to transmit or receive signaling over a short-range interface. The network-side interface 1402 may also include any component or collection of components adapted to transmit or receive signaling over a Uu interface. The coupler 1404 may include any component or collection of components adapted to facilitate bi-directional communication over the network-side interface 1402. The transmitter 1406 may include any component or collection of components (e.g., up-converter, power amplifier, etc.) adapted to convert a baseband signal into a modulated carrier signal suitable for transmission over the network-side interface 1402. A means for transmitting an initial message of an access procedure may include transmitter 1406. The receiver 1408 may include any component or collection of components (e.g., down-converter, low noise amplifier, etc.) adapted to convert a carrier signal received over the network-side interface 1402 into a baseband signal. A means for receiving mobile subscriber identifiers, initial downlink messages of access procedures, and forwarded requests to connect to a network may include receiver 1408.

The signal processor 1410 may include any component or collection of components adapted to convert a baseband signal into a data signal suitable for communication over the device-side interface(s) 1412, or vice-versa. The device-side interface(s) 1412 may include any component or collection of components adapted to communicate data-signals between the signal processor 1410 and components within the host device (e.g., the processing system 1300, local area network (LAN) ports, etc.).

The transceiver 1400 may transmit and receive signaling over any type of communications medium. In some embodiments, the transceiver 1400 transmits and receives signaling over a wireless medium. For example, the transceiver 1400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1402 comprises one or more antenna/radiating elements. For example, the network-side interface 1402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 15:
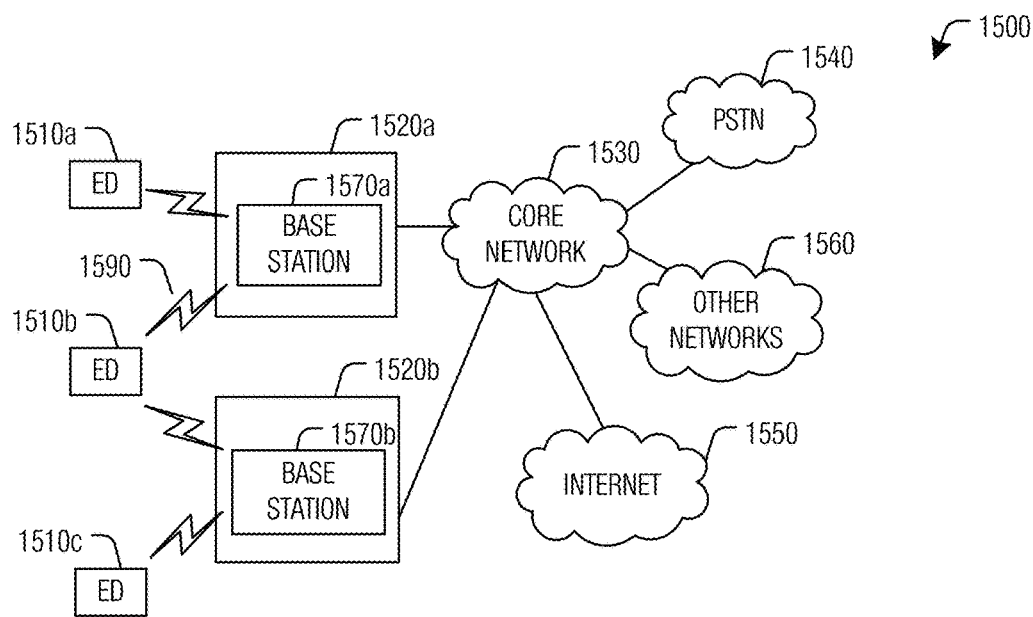
FIG. 15 illustrates an example communication system according to example embodiments described herein.

FIG. 15 illustrates an example communication system 1500. In general, the system 1500 enables multiple wireless or wired users to transmit and receive data and other content. The system 1500 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1500 includes electronic devices (ED) 1510*a*-1510*c*, radio access networks (RANs) 1520*a*-1520*b*, a core network 1530, a public switched telephone network (PSTN) 1540, the Internet 1550, and other networks 1560. While certain numbers of these components or elements are shown in FIG. 15, any number of these components or elements may be included in the system 1500.

The EDs 1510*a*-1510*c* are configured to operate and/or communicate in the system 1500. For example, the EDs 1510*a*-1510*c* are configured to transmit and/or receive via wireless or wired communication channels. Each ED 1510*a*-1510*c* represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1520*a*-1520*b* here include base stations 1570*a*-1570*b*, respectively. Each base station 1570*a*-1570*b* is configured to wirelessly interface with one or more of the EDs 1510*a*-1510*c* to enable access to the core network 1530, the PSTN 1540, the Internet 1550, and/or the other networks 1560. For example, the base stations 1570*a*-1570*b* may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 1510a-1510c are configured to interface and communicate with the Internet 1550 and may access the core network 1530, the PSTN 1540, and/or the other networks 1560.

In the embodiment shown in FIG. 15, the base station 1570a forms part of the RAN 1520a, which may include other base stations, elements, and/or devices. Also, the base station 1570b forms part of the RAN 1520b, which may include other base stations, elements, and/or devices. Each base station 1570a-1570b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1570a-1570b communicate with one or more of the EDs 1510a-1510c over one or more air interfaces 1590 using wireless communication links. The air interfaces 1590 may utilize any suitable radio access technology.

It is contemplated that the system 1500 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 1520a-1520b are in communication with the core network 1530 to provide the EDs 1510a-1510c with voice, data, application, Voice over Internet Protocol (VoIP), or other services. Understandably, the RANs 1520a-1520b and/or the core network 1530 may be in direct or indirect communication with one or more other RANs (not shown). The core network 1530 may also serve as a gateway access for other networks (such as the PSTN 1540, the Internet 1550, and the other networks 1560). In addition, some or all of the EDs 1510a-1510c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 1550.

Although FIG. 15 illustrates one example of a communication system, various changes may be made to FIG. 15. For example, the communication system 1500 could include any number of EDs, base stations, networks, or other components in any suitable configuration.

Figure 16A:
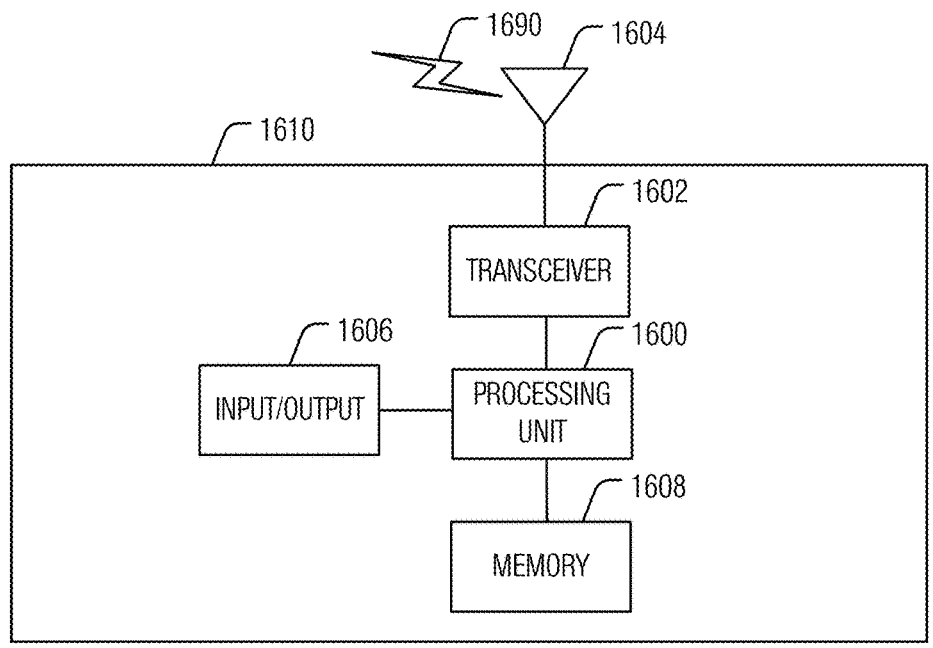
FIGS. 16A and 16B illustrate example devices that may implement the methods and teachings according to this disclosure.
Figure 16B:
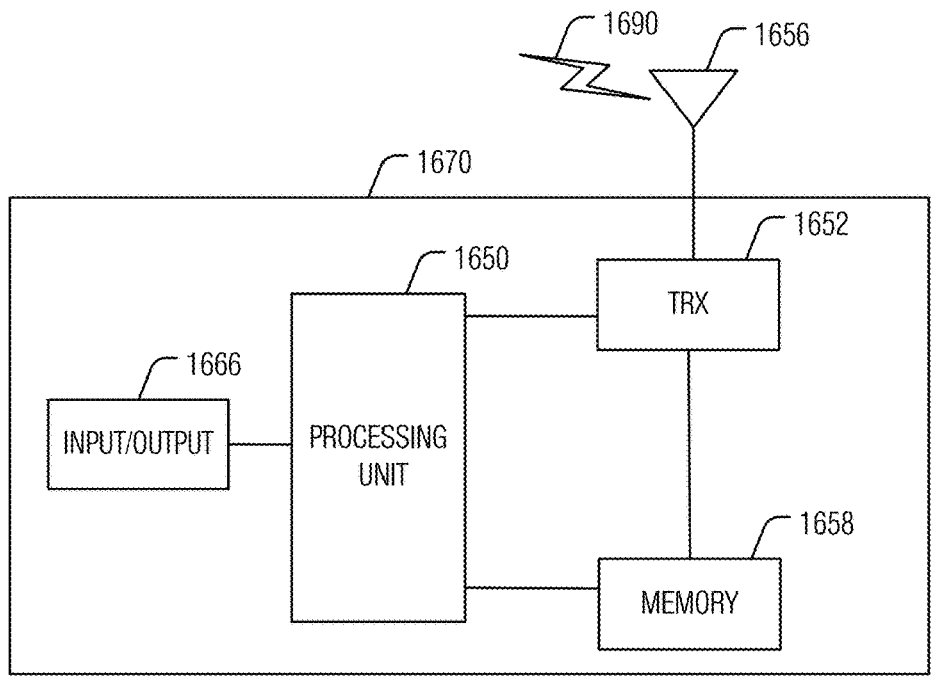

FIGS. 16A and 16B illustrate example devices that may implement the methods and teachings according to this disclosure. In particular, FIG. 16A illustrates an example ED 1610, and FIG. 16B illustrates an example base station 1670. These components could be used in the system 1500 or in any other suitable system.

As shown in FIG. 16A, the ED 1610 includes at least one processing unit 1600. The processing unit 1600 implements various processing operations of the ED 1610. For example, the processing unit 1600 could perform signal coding, data processing, power control, input/output processing, or any other functionality enabling the ED 1610 to operate in the system 1500. The processing unit 1600 also supports the methods and teachings described in more detail above. Each processing unit 1600 includes any suitable processing or computing device configured to perform one or more operations. Each processing unit 1600 could, for example, include a microprocessor, microcontroller, digital signal processor, field programmable gate array, or application specific integrated circuit.

The ED 1610 also includes at least one transceiver 1602. The transceiver 1602 is configured to modulate data or other content for transmission by at least one antenna or NIC (Network Interface Controller) 1604. The transceiver 1602 is also configured to demodulate data or other content received by the at least one antenna 1604. Each transceiver 1602 includes any suitable structure for generating signals for wireless or wired transmission and/or processing signals received wirelessly or by wire. Each antenna 1604 includes any suitable structure for transmitting and/or receiving wireless or wired signals. One or multiple transceivers 1602 could be used in the ED 1610, and one or multiple antennas 1604 could be used in the ED 1610. Although shown as a single functional unit, a transceiver 1602 could also be implemented using at least one transmitter and at least one separate receiver.

The ED 1610 further includes one or more input/output devices 1606 or interfaces (such as a wired interface to the Internet 1550). The input/output devices 1606 facilitate interaction with a user or other devices (network communications) in the network. Each input/output device 1606 includes any suitable structure for providing information to or receiving/providing information from a user, such as a speaker, microphone, keypad, keyboard, display, or touch screen, including network interface communications.

In addition, the ED 1610 includes at least one memory 1608. The memory 1608 stores instructions and data used, generated, or collected by the ED 1610. For example, the memory 1608 could store software or firmware instructions executed by the processing unit(s) 1600 and data used to reduce or eliminate interference in incoming signals. Each memory 1608 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 16B, the base station 1670 includes at least one processing unit 1650, at least one transceiver 1652, which includes functionality for a transmitter and a receiver, one or more antennas 1656, at least one memory 1658, and one or more input/output devices or interfaces 1666. A scheduler, which would be understood by one skilled in the art, is coupled to the processing unit 1650. The scheduler could be included within or operated separately from the base station 1670. The processing unit 1650 implements various processing operations of the base station 1670, such as signal coding, data processing, power control, input/output processing, or any other functionality. The processing unit 1650 can also support the methods and teachings described in more detail above. Each processing unit 1650 includes any suitable processing or computing device configured to perform one or more operations. Each processing unit 1650 could, for example, include a microprocessor, microcontroller, digital signal processor, field programmable gate array, or application specific integrated circuit.

Each transceiver 1652 includes any suitable structure for generating signals for wireless or wired transmission to one or more EDs or other devices. Each transceiver 1652 further includes any suitable structure for processing signals received wirelessly or by wire from one or more EDs or other devices. Although shown combined as a transceiver 1652, a transmitter and a receiver could be separate components. Each antenna 1656 includes any suitable structure for transmitting and/or receiving wireless or wired signals. While a common antenna 1656 is shown here as being coupled to the transceiver 1652, one or more antennas 1656 could be coupled to the transceiver(s) 1652, allowing separate antennas 1656 to be coupled to the transmitter and the receiver if equipped as separate components. Each memory 1658 includes any suitable volatile and/or non-volatile storage and retrieval device(s). Each input/output device 1666 facilitates interaction with a user or other devices (network communications) in the network. Each input/output device 1666 includes any suitable structure for providing information to or receiving/providing information from a user, including network interface communications.

Figure 17:
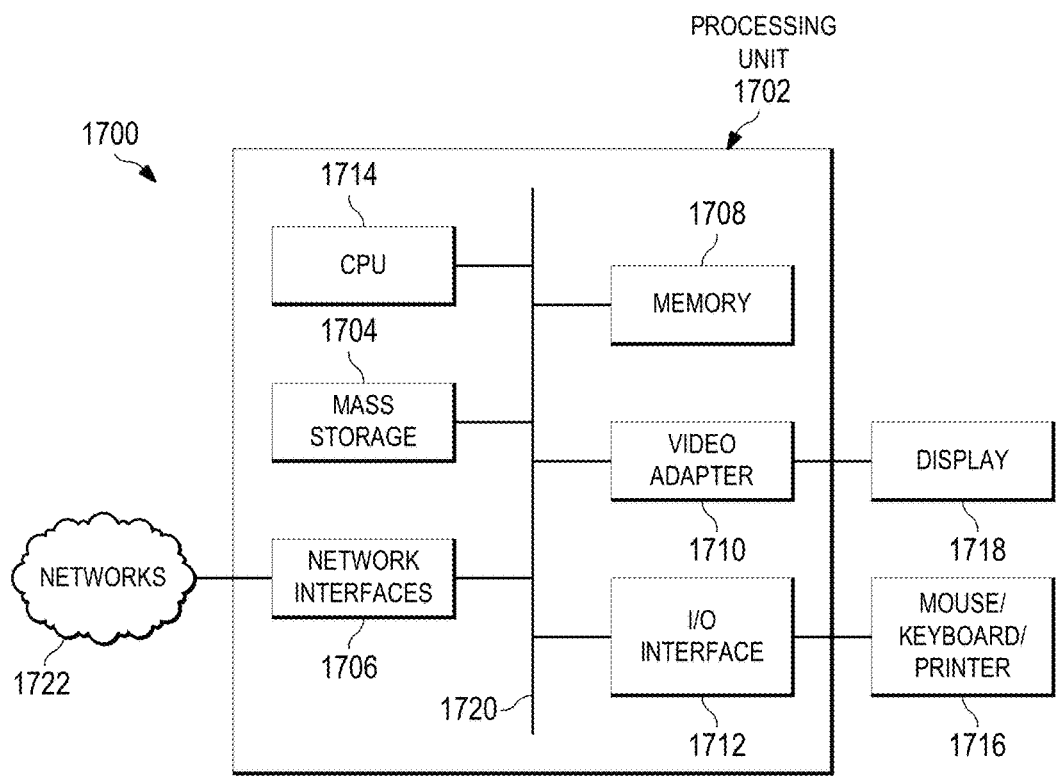
FIG. 17 is a block diagram of a computing system that may be used for implementing the devices and methods disclosed herein.

FIG. 17 is a block diagram of a computing system 1700 that may be used for implementing the devices and methods disclosed herein. For example, the computing system can be any entity of UE, access network (AN), mobility management (MM), session management (SM), user plane gateway (UPGW), and/or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1700 includes a processing unit 1702. The processing unit includes a central processing unit (CPU) 1714, memory 1708, and may further include a mass storage device 1704, a video adapter 1710, and an I/O interface 1712 connected to a bus 1720.

The bus 1720 may be one or more of any type of several bus architectures including a memory bus or memory controller, a peripheral bus, or a video bus. The CPU 1714 may comprise any type of electronic data processor. The memory 1708 may comprise any type of non-transitory system memory such as static random access memory (SRAM), dynamic random access memory (DRAM), synchronous DRAM (SDRAM), read-only memory (ROM), or a combination thereof. In an embodiment, the memory 1708 may include ROM for use at boot-up, and DRAM for program and data storage for use while executing programs.

The mass storage 1704 may comprise any type of non-transitory storage device configured to store data, programs, and other information and to make the data, programs, and other information accessible via the bus 1720. The mass storage 1704 may comprise, for example, one or more of a solid state drive, hard disk drive, a magnetic disk drive, or an optical disk drive.

The video adapter 1710 and the I/O interface 1712 provide interfaces to couple external input and output devices to the processing unit 1702. As illustrated, examples of input and output devices include a display 1718 coupled to the video adapter 1710 and a mouse/keyboard/printer 1716 coupled to the I/O interface 1712. Other devices may be coupled to the processing unit 1702, and additional or fewer interface cards may be utilized. For example, a serial interface such as Universal Serial Bus (USB) (not shown) may be used to provide an interface for an external device.

The processing unit 1702 also includes one or more network interfaces 1706, which may comprise wired links, such as an Ethernet cable, and/or wireless links to access nodes or different networks. The network interfaces 1706 allow the processing unit 1702 to communicate with remote units via the networks. For example, the network interfaces 1706 may provide wireless communication via one or more transmitters/transmit antennas and one or more receivers/receive antennas. In an embodiment, the processing unit 1702 is coupled to a local-area network 1722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a configuring unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating a user equipment (UE), the method comprising:
   receiving, by the UE from a network, a mobile subscriber identifier for the UE, the mobile subscriber identifier being assigned to the UE for exclusive use by the UE within a wireless tracking area of the network; and
   transmitting, by the UE to a relay node, an initial message of an access procedure for accessing a user data service of the network without use of a medium access control layer between the UE and a control node of the network, the initial message comprising:
      a request to connect to the control node of the network,
      the mobile subscriber identifier, and
      an indication to relay the initial message over a first signaling radio bearer (SRB) to the control node.

2. The method of claim 1, further comprising receiving, by the UE from the relay node, a setup message on the first SRB.

3. The method of claim 2, further comprising transmitting, by the UE to the relay node, a setup complete message on a second SRB.

4. The method of claim 1, wherein the first SRB is characterized by transparent operation of a link layer protocol.

5. The method of claim 1, wherein the relay node comprises a second UE.

6. The method of claim 1, wherein the access procedure is a contentionless access procedure.

7. A method for operating a relay node in a network, the method comprising:
   receiving, by the relay node from a control node of the network, an initial downlink message of an access procedure, the initial downlink message addressed in accordance with an identity of the relay node, and the initial downlink message including:
      a setup request to establish a connection between the control node and a remote device without use of a medium access control layer between the control node and the remote device, and
      an indication that the initial downlink message is associated with a first signaling radio bearer (SRB) for transmission to the remote device;
   receiving, by the relay node from the remote device, an initial uplink message of the access procedure, the initial uplink message comprising:

a request to connect to the control node of the network,
a mobile subscriber identifier of the remote device, the mobile subscriber identifier being assigned to the remote device for exclusive use by the remote device within a wireless tracking area of the network, and
an indication that the initial uplink message is associated with the first SRB for transmission to the control node; and
sending, by the relay node, the setup request to the remote device.

8. The method of claim 7, further comprising:
sending, by the relay node to the control node, the initial uplink message to the control node in a second SRB, and the indication that the initial uplink message is associated with the first SRB.

9. The method of claim 7, further comprising:
receiving, by the relay node from the remote device, a secondary uplink message of the access procedure, wherein the secondary uplink message comprises a setup complete indicating completion of the access procedure.

10. The method of claim 7, wherein the initial downlink message further comprises a logical identifier of the remote device that uniquely identifies the remote device to the relay node.

11. The method of claim 7, wherein the initial downlink message does not include physical configuration information for the remote device.

12. A method for operating a control node of a network, the method comprising:
receiving, by the control node from a relay device, a forwarded request to connect to the control node by a remote device, the forwarded request being an initial message received by the control node in an access procedure, and the forwarded request including:
a mobile subscriber identifier being assigned to the remote device for exclusive use by the remote device within a wireless tracking area of the network, and
an indication that the forwarded request is associated with a first signaling radio bearer (SRB) for transmission from the remote device to the control node; and
configuring, by the control node for the remote device, a context without a medium access control layer between the control node and the remote device, in accordance with the mobile subscriber identifier.

13. The method of claim 12, further comprising storing, by the control node, the configured context for the remote device.

14. The method of claim 13, further comprising sending, by the control node, a control message from a media access control layer of the control node to a radio resource control layer of the control node, wherein the control message comprises the mobile subscriber identifier.

15. The method of claim 12, wherein the forwarded request further comprises a logical identifier for the remote device that uniquely identifies the remote device relative to the relay device.

16. A user equipment (UE) comprising:
one or more processors; and
a computer readable storage medium storing programming for execution by the one or more processors, the programming including instructions to configure the UE to:
receive a mobile subscriber identifier for the UE, the mobile subscriber identifier being assigned to the UE for exclusive use by the UE within a wireless tracking area of a network, and
transmit, to a relay node, an initial message of an access procedure for accessing a user data service of the network without use of a medium access control layer between the UE and a control node of the network, wherein the initial message comprises:
a request to connect to the network,
a mobile subscriber identifier of the remote device, the mobile subscriber identifier being assigned to the remote device for exclusive use by the remote device within a wireless tracking area of the network, and
an indication that the initial uplink message is associated with a first SRB for transmission to the control node; and
send, from the relay node to the control node, the initial uplink message to the control node in a second SRB, and the indication that the initial uplink message is associated with the first SRB.

17. The UE of claim 16, wherein the programming includes instructions to configure the UE to receive, from the relay node, a setup message on the first SRB.

18. The UE of claim 17, wherein the programming includes instructions to configure the UE to transmit, to the relay node, a setup complete message on a second SRB.

19. A relay node comprising:
one or more processors; and
a computer readable storage medium storing programming for execution by the one or more processors, the programming including instructions to configure the relay node to:
receive, from a control node of a network, an initial downlink message of an access procedure, wherein the initial downlink message is addressed in accordance with an identity of the relay node, and wherein the initial downlink message includes:
a setup request to establish a connection between the control node and a remote device without use of a medium access control layer between the control node and the remote device, and
an indication that the initial downlink message is associated with a first signaling radio bearer (SRB) for transmission to the remote device,
receive, from the remote device, an initial uplink message of the access procedure, wherein the initial uplink message comprises:
a request to connect to the control node of the network,
a mobile subscriber identifier of the remote device, the mobile subscriber identifier being assigned to the remote device for exclusive use by the remote device within a wireless tracking area of the network, and
an indication that the initial uplink message is associated with a first SRB for transmission to the control node; and
send the setup request to the remote device.

20. The relay node of claim 19, wherein the programming includes instructions to configure the relay node to:
send, from the relay node to the control node, the initial uplink message to the control node in a second SRB, and the indication that the initial uplink message is associated with the first SRB.

21. The relay node of claim 19, wherein the programming includes instructions to configure the relay node to receive, from the remote device, a secondary uplink message of the access procedure, wherein the secondary uplink message comprises a setup complete indicating completion of the access procedure.

22. A control node comprising:
one or more processors; and
a computer readable storage medium storing programming for execution by the one or more processors, the programming including instructions to configure the control node to:
receive, from a relay device, a forwarded request to connect to the control node by a remote device, wherein the forwarded request is an initial message received by the control node in an access procedure, the forwarded request including:
a mobile subscriber identifier being assigned to the remote device for exclusive use by the remote device within a wireless tracking area of a network, and
an indication that the forwarded request is associated with a first signaling radio bearer (SRB) for transmission from the remote device to the control node, and
configure, for the remote device a context without a medium access control layer between the control node and the remote device, in accordance with the mobile subscriber identifier.

23. The control node of claim 22, wherein the programming includes instructions to configure the control node to store the configured context for the remote device.

24. The control node of claim 23, wherein the programming includes instructions to configure the control node to send a control message from a media access control layer of the control node to a radio resource control layer of the control node, wherein the control message comprises the mobile subscriber identifier.

* * * * *